United States Patent
Lian et al.

(10) Patent No.: US 10,651,652 B2
(45) Date of Patent: May 12, 2020

(54) FREQUENCY THRESHOLD DETERMINATION FOR FREQUENCY-RESPONSIVE LOAD CONTROLLERS

(71) Applicant: BATTELLE MEMORIAL INSTITUTE, Richland, WA (US)

(72) Inventors: Jianming Lian, Richland, WA (US); Yannan Sun, Richland, WA (US); Laurentiu D. Marinovici, Richland, WA (US); Karanjit Kalsi, Pasco, WA (US); Jacob Hansen, Seattle, WA (US)

(73) Assignee: Battelle Memorial Institute, Richland, WA (US)

( * ) Notice: Subject to any disclaimer, the term of this patent is extended or adjusted under 35 U.S.C. 154(b) by 139 days.

(21) Appl. No.: 15/746,258

(22) PCT Filed: Apr. 22, 2016

(86) PCT No.: PCT/US2016/028901
§ 371 (c)(1),
(2) Date: Jan. 19, 2018

(87) PCT Pub. No.: WO2017/019136
PCT Pub. Date: Feb. 2, 2017

(65) Prior Publication Data
US 2019/0027933 A1 Jan. 24, 2019

Related U.S. Application Data

(60) Provisional application No. 62/197,979, filed on Jul. 28, 2015.

(51) Int. Cl.
*H02J 3/14* (2006.01)
*H02J 3/00* (2006.01)
(Continued)

(52) U.S. Cl.
CPC .................. *H02J 3/14* (2013.01); *H02J 3/00* (2013.01); *H02J 3/12* (2013.01); *H02J 3/24* (2013.01);
(Continued)

(58) Field of Classification Search
CPC ........ H02J 3/14; H02J 3/00; H02J 3/12; H02J 3/24; H02J 3/46; H02J 7/00; Y02B 70/3225; Y04S 20/222
See application file for complete search history.

(56) References Cited

U.S. PATENT DOCUMENTS 4,914,564 A 4/1990 Surauer et al.
2010/0072817 A1 * 3/2010 Hirst .................. H02J 3/14
307/31

(Continued)

FOREIGN PATENT DOCUMENTS

GB 2361118 A * 10/2001 ................ H02J 3/14
WO WO 2013/149076 10/2013

OTHER PUBLICATIONS

International Search Report and Written Opinion dated Jul. 25, 2016, from International Patent Application No. PCT/US2016/028901, 10 pages.

*Primary Examiner* — Thomas C Lee
*Assistant Examiner* — Michael Tang
(74) *Attorney, Agent, or Firm* — Klarquist Sparkman LLP

(57) ABSTRACT

Systems, methods, and computer media for managing frequency response in a power grid are provided herein. Individual grid-connected electrical devices can be turned on and/or off by corresponding frequency-responsive load controllers when frequency deviations beyond a threshold are detected. Each controller selects, for the corresponding electrical device, a frequency threshold from available frequencies in a frequency range. If the selected frequency falls within a deadband frequency range, then the controller sets the frequency threshold to a frequency outside of the dead- (Continued)

band (e.g., to a closest available frequency outside of the deadband). On a system-wide level, this approximates a uniform distribution of frequency thresholds over the entire frequency range, including the deadband, and achieves the proper power-to-frequency relationship for grid stability. A supervisory coordinator can determine the frequency range from which a frequency threshold is selected based on aggregated power information for devices and controllers throughout the grid.

20 Claims, 11 Drawing Sheets

(51) Int. Cl.
*H02J 3/12* (2006.01)
*H02J 7/00* (2006.01)
*H02J 3/24* (2006.01)
*H02J 3/46* (2006.01)

(52) U.S. Cl.
CPC ................................. *H02J 3/46* (2013.01); *H02J 7/00* (2013.01); *Y02B 70/3225* (2013.01); *Y04S 20/222* (2013.01)

(56) References Cited

U.S. PATENT DOCUMENTS

| | | |
|---|---|---|
| 2010/0090532 A1 | 4/2010 | Shelton et al. |
| 2013/0015663 A1 | 1/2013 | Kumula et al. |
| 2013/0268132 A1 | 10/2013 | Pratt et al. |
| 2014/0025217 A1* | 1/2014 | Jin ...................... H02J 13/0006 700/295 |
| 2014/0197749 A1* | 7/2014 | Yoon ................... H05B 33/083 315/191 |
| 2015/0022007 A1 | 1/2015 | Ma et al. |
| 2015/0137519 A1 | 5/2015 | Tarnowski |

* cited by examiner

FREQUENCY THRESHOLD DETERMINATION FOR FREQUENCY-RESPONSIVE LOAD CONTROLLERS

CROSS REFERENCE TO RELATED APPLICATIONS

This application is the U.S. National Stage of International Application No. PCT/US2016/028901, filed Apr. 22, 2016, which was published in English under PCT Article 21(2), which in turn claims the benefit of U.S. Provisional Application No. 62/197,979, filed on Jul. 28, 2015, and titled "CONTROLLER DESIGN OF GRID FRIENDLY APPLIANCES FOR PRIMARY FREQUENCY RESPONSE." The provisional application is incorporated herein by reference in its entirety.

ACKNOWLEDGMENT OF GOVERNMENT SUPPORT

This invention was made with Government support under Contract No. DE-AC05-76RL01830 awarded by the U.S. Department of Energy. The Government has certain rights in the invention.

BACKGROUND

Due to growing environmental concerns and economic and political requirements, the integration of renewable energy into the power grid has become a growing trend. Renewable energy sources have the potential to lead to a significant reduction in fossil fuel consumption and carbon dioxide emissions. Renewable energy generation, however, is typically non-dispatchable because it is often operated at the maximum output due to the low marginal cost of renewable energy. In addition, the available output of renewable generation is very variable and uncertain due to the intermittency of renewable energy.

Large-scale integration of renewable energy into the power grid substantially increases the need for operational reserves. At the same time, the total system inertia, as well as contingency reserve, is decreasing as conventional generation is gradually displaced by non-dispatchable renewable generation. Therefore, it becomes extremely difficult for a system operator to maintain the stability and reliability of the power grid. If operational reserves are required to be provided by conventional generation for stability reasons, it diminishes the net carbon benefit from renewables, reduces generation efficiency, and becomes economically untenable. Hence, renewable penetration is still limited due to the lack of appropriate technologies that are able to reliably and affordably manage the dynamic variability introduced by renewable generation.

Demand-side approaches can help alleviate some of the instability resulting from renewable generation sources. Conventionally, demand-side loads are treated as passive and non-dispatchable, but demand-side approaches such as management of flexible loads have begun to be introduced. Such approaches, however, typically do not produce a frequency response curve that closely matches the desired curve, which can cause additional instability. Further, conventional demand-side approaches can over- or undercompensate by managing too many or too few loads.

SUMMARY

Examples described herein relate to frequency-responsive load controllers that control associated grid-connected electrical devices and determining frequency thresholds at which such controllers manage the associated grid-connected electrical devices. A frequency-responsive load controller can provide a demand-side contribution to stabilizing the power grid by turning a grid-connected electrical device on or off in order to bring the grid frequency closer to a target value (e.g., 50 or 60 Hz).

In some examples, a frequency range extending from a target grid frequency to an end frequency can be determined. A first portion of the frequency range can be identified as a deadband within which a grid-connected electrical device is not turned on or off responsive to grid frequency deviations. The first portion extends from the target grid frequency to a deadband bound frequency. A second portion of the frequency range extends from the deadband bound frequency to the end frequency. A frequency, from the frequency range, can be selected for use as the frequency threshold. The frequency threshold is the grid frequency at which the grid-connected electrical device is automatically turned off or turned on by an associated frequency-responsive load controller. If the frequency selected for use as the frequency threshold is within the deadband, the frequency threshold is set to a frequency within the second portion of the frequency range. For example, the frequency threshold can be set to a first available frequency outside the deadband.

In some examples, the frequency range is determined by receiving instructions from a supervisory coordinator configured to establish the frequency range based on aggregated characteristics of a number of grid-connected electrical devices being managed by corresponding frequency-responsive load controllers. For example, individual frequency-responsive load controllers can provide power (and state) information to the supervisory coordinator, and the coordinator can aggregate the power information and determine frequency range(s) from which frequency thresholds can be selected based on the aggregated power information and a target power-frequency curve. Power information can be re-aggregated periodically (and the frequency range recalculated) to accurately reflect the current load on the grid. In such situations, the frequency thresholds can be re-selected using the recalculated frequency range to provide the desired power-frequency curve.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

DETAILED DESCRIPTION

Figure 1:
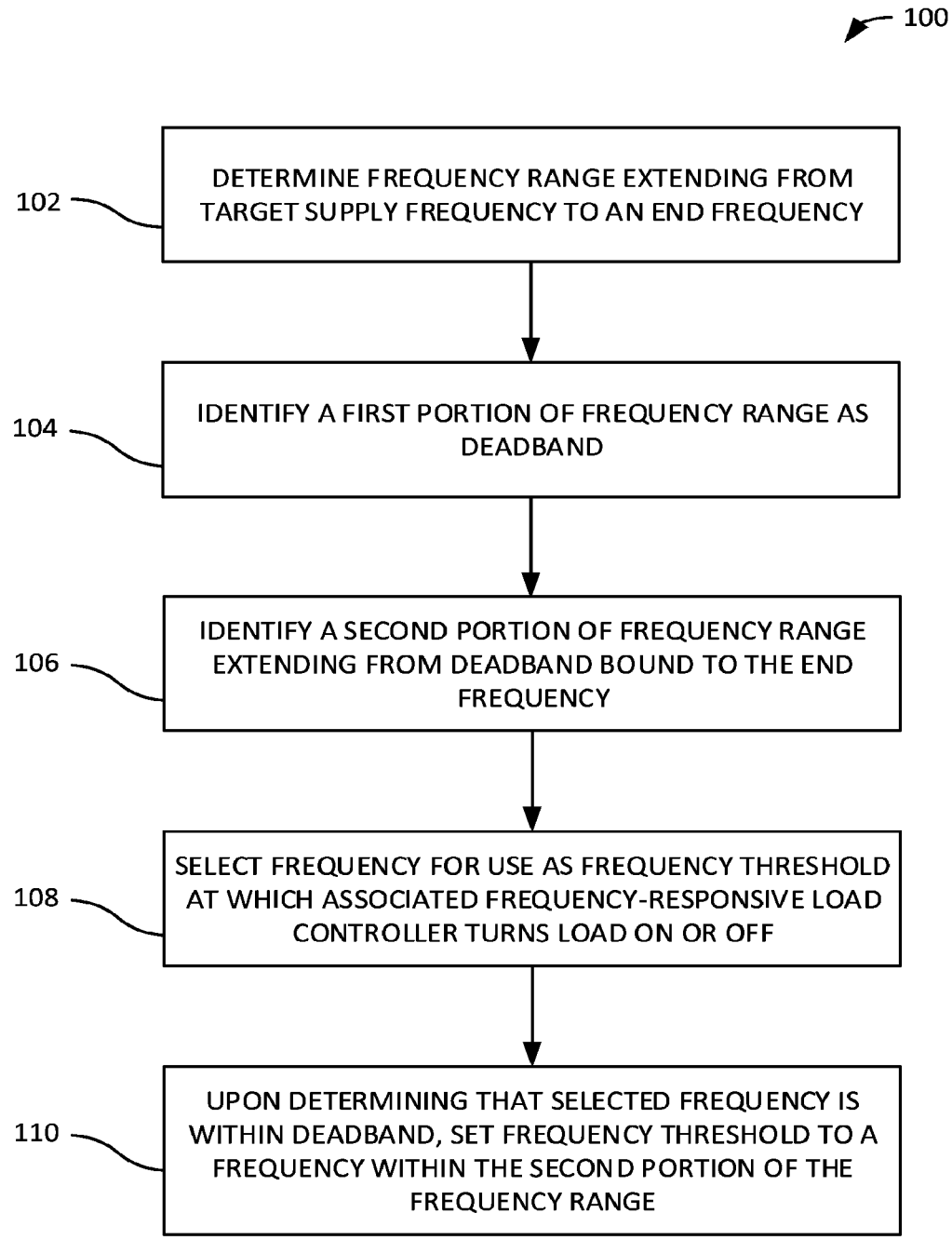
FIG. 1 is a diagram illustrating an example method of managing frequency response using a grid-connected electrical device.

Using the systems, methods, and computer-readable media described herein, frequency thresholds can be determined at which grid-connected electrical devices can be turned on or off by associated frequency-responsive load controllers to provide "primary frequency response" for a power grid. As used herein, "primary frequency response" refers to adjusting system generation or system load of a power grid to balance the amount of generation with the amount of load (also referred to as demand), thereby maintaining a grid frequency (frequency of the voltage or current supplied by the grid) near to a target frequency (e.g., 50 or 60 Hz). A grid frequency that begins to drop below the target frequency indicates excess demand relative to generation, and a grid frequency that begins to rise above the target frequency indicates excess generation relative to demand. Unlike previous approaches to selection of frequency thresholds, the described technologies maintain a desired "droop-like" power-to-frequency curve that indicates grid stability. "Droop" refers to a control scheme for generators in the power grid. A device performing droop control is automatically adjusting its power output in accordance to frequency deviations. Droop can be defined as the percentage change in frequency at which the device delivers all of its frequency regulating capability. "Droop-like" refers to a scheme where a device is automatically adjusting its power output in accordance to frequency deviations, regulating frequency at a defined percentage relative to frequency deviation until the resource is exhausted. The described technologies also allow determination of frequency thresholds in both autonomous and supervised arrangements.

In an example autonomous arrangement, individual grid-connected appliances (e.g., electric water heaters) are separately and autonomously controlled by corresponding individual frequency-responsive load controllers. For a particular appliance, the frequency-responsive load controller randomly (or otherwise) selects a frequency threshold from available frequencies in a frequency range. If the selected frequency falls within a deadband, then the controller sets the frequency threshold to a frequency outside of the deadband instead. As a specific example, the controller can set the frequency threshold to a first available frequency (or a frequency within a narrow frequency band) outside of the deadband.

The deadband is a frequency range near the target frequency and within which deviations from the target frequency are considered to be small enough to ignore for demand-side primary frequency response purposes. In conventional approaches, because the frequencies within the deadband are not available to be set as the frequency threshold, the resulting distribution of frequency thresholds over all controllers is not uniform over the entire frequency range, and the power-to-frequency relationship of the grid is not droop-like. In the described technologies, however, the controller selects the frequency threshold from a frequency range that includes frequencies in the deadband, but instead of actually using the frequency within the deadband as the threshold if selected, the controller uses the closest available frequency outside of the deadband. As used herein, "available" means available for use as a frequency threshold. Frequencies within the deadband, which cannot be used as the frequency threshold, are unavailable. "Available" does not refer to a state of being "taken" or in use by another load controller. That is, if, for multiple load controllers, a frequency in the deadband is selected, more than one (or all) of the load controllers can set the frequency threshold to the first frequency outside of the deadband. When viewed on a system-wide level, this approach effectively produces a weighting scheme that approximates what a uniform distribution of frequency thresholds over the entire frequency range, including the deadband, would be. This weighted distribution achieves the proper power-to-frequency relationship for grid stability while still allowing frequency thresholds to be excluded from the deadband.

In an example supervised arrangement, a supervisory coordinator can aggregate power information (e.g., load and on/off status) for many grid-connected electrical devices. Based on the aggregate power available for being turned on or being turned off, a frequency range available for frequency thresholds can be determined based on a desired power-frequency curve. By considering the overall power of the loads available in the system, situations in which too much or too little load power is turned on or off (which creates instability in the grid) can be avoided. Individual frequency-responsive controllers can select frequency thresholds, for example as described above in the autonomous arrangement, once a frequency range has been communicated to the controllers. In some examples, frequency threshold selection for individual controllers can be performed by the supervisory coordinator, and the thresholds can be communicated to the individual controllers.

The described technologies produce a significant improvement to the power grid management technology and "smart" device technology areas. The demand-side approaches described herein reduce the need to rely on power generators to manage primary frequency response and allow for a greater integration of renewable energy sources into the grid. Further, by determining a range of frequency thresholds that result in a stable, droop-like power-to-frequency curve, the frequency-responsive controllers will be triggered less often by not having to correct the instability caused by the controllers' own response and will thus consume fewer controller computing resources. Additional examples are described below and with reference to FIGS. 1-11.

Frequency Threshold Selection Examples and Examples of Autonomous Arrangements

Demand-side control presents a novel and viable way to supplement the conventional generation-side control for a power grid having an increased percentage of renewable power sources. An autonomous arrangement in which frequency-responsive controllers associated with corresponding grid-connected electrical devices respond individually to frequency deviations provides a fast response time for grid stabilization. In some approaches, autonomous response occurs for under-frequency load shedding, in which loads are turned off at larger frequency deviations from a target grid frequency in order to prevent, for example, a grid or substation failure. Such approaches, however, do not provide the proper droop-like frequency response necessary for demand-side primary frequency response.

The frequency-responsive load controllers described herein can be, for example, small electronic devices that reside within grid-connected electrical devices (also referred to simply as "devices") such as appliances. The frequency-responsive load controllers (also referred to simply as "controllers") can be configured to monitor, for example, the AC voltage (or current) signal available to the devices at their wall outlets. When an under-frequency (or in some examples, an over-frequency) event is detected, the controller will alter the operating mode of a corresponding device to help the power grid, provided the device's current operating mode can be changed. In the example of an under-frequency event, the controller is configured to request that the electrical load be shed by its corresponding device whenever the grid frequency falls below a particular curtailing frequency threshold. The curtailing frequency threshold can be, for example, randomly chosen. In an over-frequency example, the controller is configured to request that an electrical device be turned on whenever the grid frequency exceeds a particular rising frequency threshold, which can also be randomly chosen.

In recent years, appliance and equipment manufacturers have moved rapidly toward mass production of devices with smart grid capabilities that can be used with the described technologies. For implementation of frequency-responsive load controllers, the response time (e.g., the time constant of a low-pass filter for frequency measurement), can directly affect the frequency response of the bulk power system. In general, the shorter the response time, the better the system response. Shorter response time, however, can lead to false inputs and noise. In practice, selection of an appropriate response time can be done by analyzing the frequency characteristics of historic frequency events.

The geographical distribution of controller-controlled devices within a system can also influence the impact of the demand-side management on the grid. Although there are indications that it may be more effective to have all the controllers deployed in the proximity of the location where the under- or over-frequency events have been caused, it is typically not possible in practice to know beforehand the location of such events. An even distribution throughout a system can be used instead. Such an even distribution can be implemented through coordination among various system operators from different areas.

Another factor that can influence the effect of controllers on frequency response in the grid is the penetration level of controllers and associated devices (how many devices having an associated controller that are currently on and are thus available to be turned off or how many devices having an associated controller that are currently off and are thus available to be turned on). Transient signals tend to increase as the penetration level of controllers increases, which can potentially drive the system to instability. One approach to limiting transients is to limit how many controllers should actually respond to under-frequency events. For an autonomous arrangement, all available controllers will typically respond, regardless of possible negative consequences of the aggregated effect. The autonomous response of controllers from different geographical locations can instead, for example, be coordinated so that negative consequences are mitigated.

Previous demand-side approaches to grid frequency management have been used for under-frequency load shedding and have not been used for primary frequency response due to, among other things, the lack of a droop-like frequency response curve. In some situations, such approaches can result in excessive power reduction, which can impact the system stability negatively.

FIG. 1 illustrates a method 100 of managing frequency response using a grid-connected electrical device. Method 100 can be performed by or using, for example, a frequency-responsive load controller connected to or installed in the grid-connected electrical device. Example frequency-responsive load controllers are discussed with respect to FIGS. 6 and 7. The discussion of method 100 also references the examples shown in FIGS. 2A, 2B, 3A, and 3B for clarity.

Figure 2A:
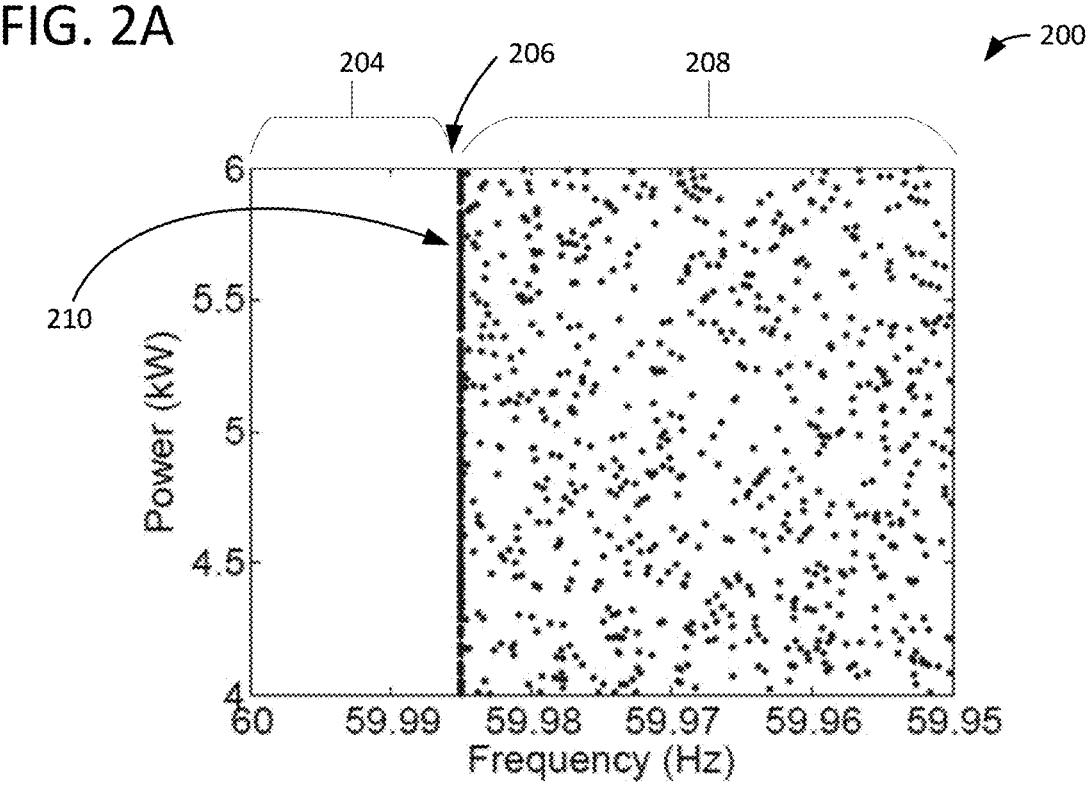
FIG. 2A is a scatter plot illustrating the curtailing frequency threshold and power of a plurality of example grid-connected electrical devices where the curtailing frequency of the devices is set to be at a first available frequency outside of the deadband if initially randomly selected to be inside the deadband.
Figure 2B:
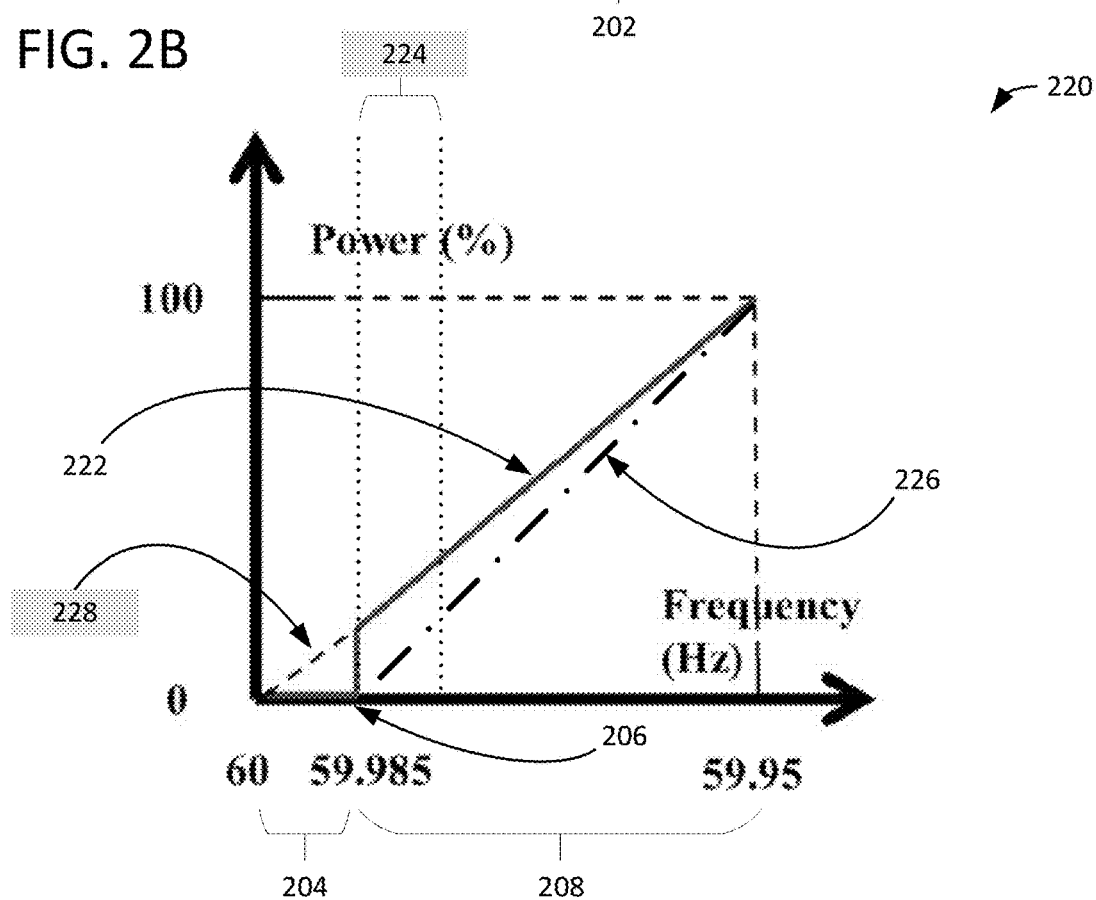
FIG. 2B is a graph illustrating a droop-like power-frequency curve resulting from the curtailing frequency thresholds illustrated in FIG. 2A.

In process block 102, a frequency range extending from a target grid frequency to an end frequency is determined. An example frequency range and target grid frequency are shown in FIGS. 2A and 2B. FIGS. 2A and 2B show plots 200 and 220, respectively, that illustrate an under-frequency case in which devices are turned off when the grid frequency falls below the target grid frequency. In FIGS. 2A and 2B, the target grid frequency is 60 Hz, and the frequency range is frequency range 202 that extends from the target grid frequency of 60 Hz to the end frequency of 59.95 Hz.

The target grid frequency can depend upon the electrical grid. For example, the target grid frequency can be 60 Hz, as is typically used in North America, or 50 Hz, as is typically used in much of Europe and the rest of the world. The end frequency can be either be below the target grid frequency, as illustrated in FIGS. 2A and 2B, or above the target grid frequency as illustrated in the over-frequency example shown in FIG. 3. The end frequency can be: predetermined or dynamically calculated based on historic under- or over-frequency events and/or historic or current total system load of controlled devices; based on empirically determined or calculated frequencies at which the grid becomes unstable or reaches a performance threshold; or based on other factors.

In process block 104, a first portion of the frequency range is identified as a deadband. The deadband extends from the target grid frequency to a deadband bound frequency. The deadband is a frequency range within which the grid-connected electrical device is not turned on or off by the frequency-responsive load controller. That is, frequency deviations within the deadband are tolerated, and demand-side management is not used to address the deviations. In the under-frequency example of FIGS. 2A and 2B, a deadband 204 is shown, extending from the target grid frequency of 60 Hz to a deadband bound frequency 206 (of 59.986 Hz). The extent of the deadband can be: predetermined or dynamically calculated based on historic under- or over-frequency events and/or historic or current total system load of controlled devices; based on controller response time; based on historic, empirically determined, or calculated frequencies at which primary frequency response is determined to be desirable; or based on other factors. In some examples, the size of deadband 204 is comparable to generation-side deadbands used in generation-side frequency response.

A second portion of the frequency range extending from the deadband bound frequency to the end frequency is identified in process block 106. With reference again to FIGS. 2A and 2B, a second portion 208 of frequency range 202 extends from a first available frequency (59.985) below deadband bound frequency 206 to the end frequency (59.95 Hz).

In process block 108, a frequency, from the frequency range (e.g., from frequency range 202 of FIG. 2A), is selected for use as a frequency threshold. The frequency threshold is a grid frequency at which the grid-connected electrical device is automatically turned off or turned on by an associated frequency-responsive load controller. In under-frequency examples, such as the example illustrated in FIGS. 2A and 2B, the deadband bound frequency is lower than the target grid frequency and the end frequency is lower than both the deadband bound frequency and the target grid frequency. In such examples, the frequency threshold is a curtailing frequency threshold, and the curtailing frequency threshold is the grid frequency at which the grid-connected electrical device is turned off by the associated frequency-responsive load controller. Frequency deviations below the target grid frequency indicate a greater load than can be supported by the current generation capacity.

Figure 3A:
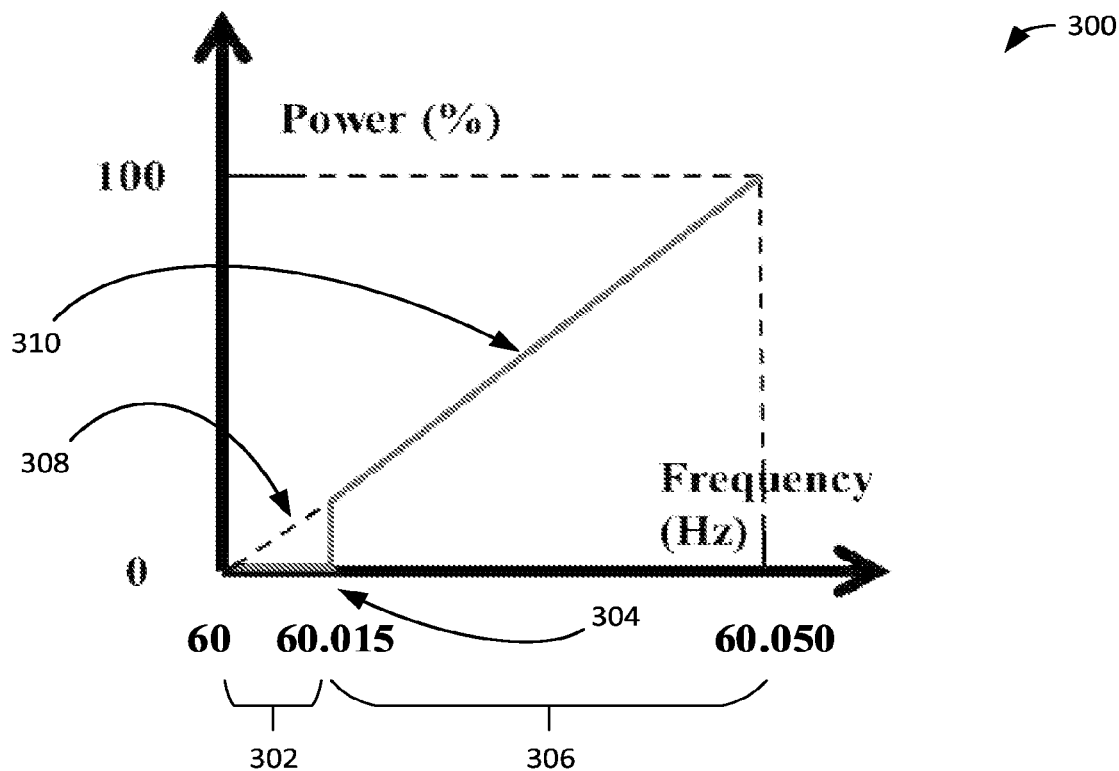
FIG. 3A is a graph illustrating a droop-like power-frequency curve in an over-frequency example.

In over-frequency examples, such as the example illustrated in FIG. 3A, the deadband bound frequency is higher than the target grid frequency and the end frequency is higher than both the deadband bound frequency and the target grid frequency. In such examples, the frequency threshold is a rising frequency threshold, and the rising frequency threshold is the grid frequency at which the grid-connected electrical device is turned on by the associated frequency-responsive load controller. Frequency deviations above the target grid frequency indicate greater generation than can be used by the current grid load.

In some examples, both a rising frequency threshold and a curtailing frequency threshold are established (along with two corresponding frequency ranges, end frequencies, and deadbands) for a controller and corresponding device, allowing the device to be used for over-frequency or under-frequency response. When both a rising frequency threshold and a curtailing frequency threshold are used, the frequency ranges, deadbands, etc. can be mirrored around the target grid frequency or determined separately (as shown, for example, in FIG. 3B).

The frequency selected for use as the frequency threshold in process block 108 can be selected, for example, using a probabilistic approach, such as random selection, to select the frequency from a group of available frequencies in the frequency range. For example, a frequency responsive load controller can randomly select a number between the end frequency and the target grid frequency. Random selection, over a large sample size, results in a uniform distribution of selected frequencies over the frequency range. An example of a large number of controllers each having a randomly selected frequency threshold is illustrated in FIG. 2A and discussed below.

Upon determining, that the frequency selected for use as the frequency threshold is within the deadband, the frequency threshold is set to a frequency within the second portion of the frequency range in process block 110. In some examples, when the selected frequency is within the deadband, the frequency threshold is set to an available frequency that is closest to the deadband bound frequency. This is illustrated in plot 200 of FIG. 2A, where many points (each representing an individual controller) are located at frequency 210. Frequency 210 is a first available frequency outside of deadband 204. For selected frequencies that are inside deadband 204, the frequency threshold is set to frequency 210 to provide a weighting to create a desired droop-like response, illustrated by power-frequency curve 222 of FIG. 2B, while still maintaining deadband 204.

As used herein, "available" means available for selection. The frequencies that are available are outside of the deadband and account for the granularity with which frequency can be specified. Frequency can be selected in increments of 0.0001 Hz, 0.001 Hz, 0.005, 0.01 Hz, or other increments. As an example, if frequency is specified/selectable in 0.005 Hz increments, even though a frequency that is 0.00000001 Hz outside of the deadband bound is closer to the deadband bound than a second frequency 0.005 Hz outside the deadband bound, the second frequency is the closest available frequency because of the 0.005 Hz frequency increments being used. In an under-frequency example, for a deadband bound frequency indicating the end of the deadband is 59.986, 59.990, etc., if the selected frequency is within the deadband, the frequency threshold can be set to 59.985, 59.980, or other value below but near the end of the deadband.

In some examples, the second portion of the frequency range comprises a third portion extending from the deadband bound to less than halfway from the deadband bound to the end frequency, and the frequency within the second portion of the frequency range to which the frequency threshold is set is within the third portion. Plot 220 of FIG. 2B illustrates a third portion 224. Third portion 224 is less than half of the size of second portion 208 and extends from just below the deadband bound frequency 206 to approximately 59.97 Hz. (In this particular example, third portion 224 is approximately a same size as deadband 204.) The frequency within the third portion used as the frequency threshold can be selected, for example, by randomly selecting one of the available frequencies within the third portion. The third portion provides a relatively narrow band (as compared to the second portion) of frequencies that can be used to adjust the frequency response curve to a more droop-like shape. In contrast to FIG. 2A in which the first available frequency is used as the threshold for the controllers for which the selected frequency for use as the threshold is within the deadband, setting the threshold to a value within third portion 224 of FIG. 2B provides a more gradual initial response to under-frequency events while still providing a droop-like response as illustrated by power-frequency curve 222.

Method 100 can further comprise upon determining that the grid frequency meets the frequency threshold, turning off (for under-frequency events) or turning on (for over-frequency events) the electrical device. In some examples, frequency of the grid voltage is measured, and the measurement is compared to the threshold. Grid current frequency can also be measured. Frequency measurement, as used herein, also includes measuring the period of a signal (which is the inverse of frequency). Measurements/comparisons can be performed periodically.

In some examples, the frequency range is determined by receiving instructions from a supervisory coordinator configured to establish the frequency range based on aggregated characteristics of a plurality of grid-connected electrical devices being managed by corresponding frequency-responsive load controllers. The aggregated characteristics can include power consumption or peak power consumption as well as an "on" or "off" status. In some examples, method 100 is performed by the supervisory coordinator, and the frequency threshold(s) are communicated to individual controllers. Supervisory coordinators are discussed further below.

FIG. 2A illustrates a plot 200 of an example distribution of approximately 1,000 devices having associated controllers. The power rating of the devices is distributed uniformly between 4 and 6 kW. Each point in plot 200 represents a device having a curtailing frequency threshold and a power rating. The frequency thresholds are uniformly distributed over second portion 208 of frequency range 202, with the exception of the many points located at frequency 210, which is the first available frequency below deadband 204. The points at frequency 210 represent controllers for which the frequency selected for use as the frequency threshold fell within deadband 204, and because deadband frequencies are not available for use as a frequency threshold, the frequency threshold for these controllers was instead set to first available frequency 210. This approach provides a weighting to create the desired droop-like response while still keeping deadband 204 unavailable for frequency thresholds.

Plot 220 of FIG. 2B illustrates droop-like power-frequency curve 222 that corresponds to the distribution shown in FIG. 2A. The x-axis of plot 220 represents frequency, and the y-axis represents a percentage of the aggregate controller-managed power that is turned off by the controllers to provide primary frequency response. As is illustrated in plot 220, due to the random distribution of frequency thresholds illustrated in FIG. 2A, the number of controllers turning off a corresponding device increases as the grid frequency drops until, at the end of second portion 208 of frequency range 202, all of the available controllers have turned their corresponding device off.

As discussed above, deadband 204 represents a frequency band in which frequency deviations are tolerated and primary frequency response is not initiated. The deadband acts to ignore noise and prevent overreactions and serves other purposes as well. In a theoretical simplification without a deadband, in which the practical reasons for using a deadband would not apply, a droop-like response in a system without a deadband would include dashed line 228, such that the droop-like response both is linear over all of frequency range 202 and reaches the 0% power, 60 Hz point on plot 220. Using the described approaches, the "weighting" provided by the many controllers for which frequency thresholds are set at first available frequency 210 (or in third portion 224) provides a step- or impulse-type response that quickly brings the power percentage to the theoretical level (meeting dotted line 228) for a frequency deviation just below deadband 204. The uniform distribution of the remaining frequency thresholds maintains the droop-like response over the remainder of frequency range 202. Thus, power-frequency curve 222 has the desired characteristic of being droop-like over frequency range 202 while also dropping to zero because of the practically desirable use of the deadband.

In contrast to the described technology, in a conventional approach, use of the deadband (e.g., deadband 204), results in a power-frequency curve 226. In power-frequency curve 226, rather reaching 0% power at 60 Hz, 0% power is reached at deadband bound frequency 206. While power-frequency curve 226 is linear, the slope of power-frequency curve 226 differs from power-frequency curve 222 because of the different 0% power frequency, and power-frequency curve 226 is therefore not droop-like. The non-droop-like response in previous approaches is most noticible for frequency deviations just slightly below the deadband because few controllers will be triggered as compared to the approaches shown in FIGS. 2A and 2B.

Figure 3B:
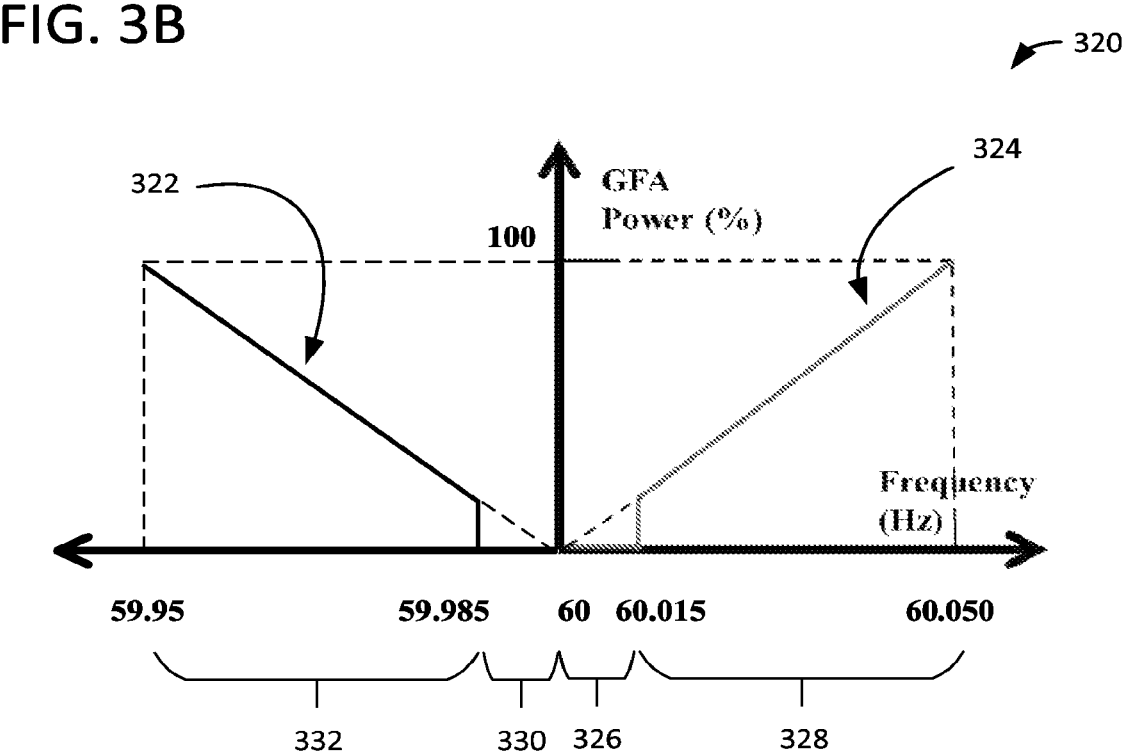
FIG. 3B is a graph illustrating droop-like power-frequency curves for an example in which controllers can be used in both over- and under-frequency situations.

FIGS. 2A and 2B illustrate an under-frequency example. FIG. 3A illustrates an over-frequency example, and FIG. 3B illustrates an example in which primary frequency response can be provided for both under- and over-frequency situations. FIG. 3A illustrates a plot 300 similar to plot 202 of FIG. 2B, except that the frequency range along the x-axis increases from left to right to represent an over-frequency example. A frequency range extends from a target grid frequency of 60 Hz to an end frequency of 60.050 Hz. A deadband 302 extends from 60 Hz to a deadband bound frequency 304. A second portion 306 of the frequency range extends from just above the deadband bound frequency 304 to the end frequency (60.050 Hz).

Rising frequency thresholds are selected from the entire frequency range (from 60 Hz to 60.050 Hz), and for controllers for which a selected frequency falls within deadband 302, the rising frequency threshold is set to a frequency within second portion 306 (e.g., a closest available frequency above deadband 302 or a frequency within a narrow frequency band extending from deadband bound frequency 304). Similar to plot 220 of FIG. 2B, no controllers activate devices for frequency deviations within deadband 302, and the number of controllers turning on a corresponding device increases as the grid frequency increases until, at the end of second portion 306, all of the available controllers have turned their corresponding device on.

Also similar to plot 220 of FIG. 2B, the "weighting" provided by the many controllers for which rising frequency thresholds are set at a first available frequency above deadband 302 (or in a narrow frequency band above deadband 302) provides a step- or impulse-type response that quickly brings the power percentage to the theoretical level (meeting dotted line 308) for a frequency deviation just above deadband 302. The uniform distribution of the remaining frequency thresholds maintains a droop-like response over the remainder of frequency range 306, as shown by power-frequency curve 310. Thus, power-frequency curve 310 has the desired characteristic of being droop-like over frequency range 306 while also dropping to zero over deadband 302 because of the practically desirable use of deadband 302.

FIG. 3B shows a plot 320 of power-frequency curves 322 and 324. Power-frequency curve 322 is an under-frequency example as shown in FIG. 2B (with the slope of power-frequency curve 322 going negative to account for the x-axis values of frequency increasing to the right, in contrast to FIG. 2B). Power-frequency curve 324 is an over-frequency example as shown in FIG. 3A. In plot 320, there is an upper (or rising) deadband 326 and an upper second portion 328 (similar to deadband 302 and second portion 306 of FIG. 3A). Upper deadband 326 and upper second portion 324 form an upper frequency range. Similarly, plot 320 includes a lower (or curtailing) deadband 330 and a lower second portion 332 (similar to deadband 204 and second portion 208 of FIG. 2B) that together form a lower frequency range. The upper frequency range is used for over-frequency primary frequency response, and the lower frequency range is used for under-frequency primary frequency response, similar to the discussion with respect to FIGS. 2A-3A. In some examples, the upper frequency range and lower frequency range are a same size and rising deadband 326 and curtailing deadband 330 are a same size. In other examples, they are determined separately, and rising deadband 326 does not necessarily correspond to curtailing deadband 330, etc.

The technology described herein was tested for an under-frequency example using the IEEE 16-machine 68-bus test system. This test system approximates the interconnection between the New England test system (NETS) and the New York power system (NYPS). There are five areas in total. Area 4 represents NETS with generators G1 to G9, and area 5 represents NYPS with generators G10 to G13. Generators G14 to G16 are equivalent aggregated generators that model the three neighboring areas connected to NYPS. The system parameters are taken from the data files that come with the Power System Toolbox (PST) distribution. The total load in the system is 18,333.90 MW with 5,039.00 MW in the NETS (area 4) and 7,800.95 MW in the NYPS (area 5). The total load of online GFAs is 800 MW, which are evenly distributed among areas 4 and 5. The controllers in these studies are selected to be electric water heaters. The curtailment time delay $t_{d\_c}$ is selected to be 0.4 seconds for the hardware implementation. The activation time delay $t_{d\_a}$ is randomly chosen between 2 and 3 minutes.

Two scenarios were considered. In the first scenario, the system responses in four situations are compared when the system is subject to small disturbances. The under-frequency event considered here is the tripping of generator G1. Since the power output of generator G1 is small, the resulting frequency deviation is so small that the lowest frequency is within the range of 59.95 Hz and 59.985 Hz. In the second scenario, the comparison between the system responses in four different situations is performed again when the system is subject to a large disturbance. The under-frequency event in this case study is the tripping of generator G12, which has large power output before the tripping occurs. In both scenarios, primary frequency response using the described technology was very close to the desired droop-like situation.

Example Controllers and Controller Operation

Figure 4:
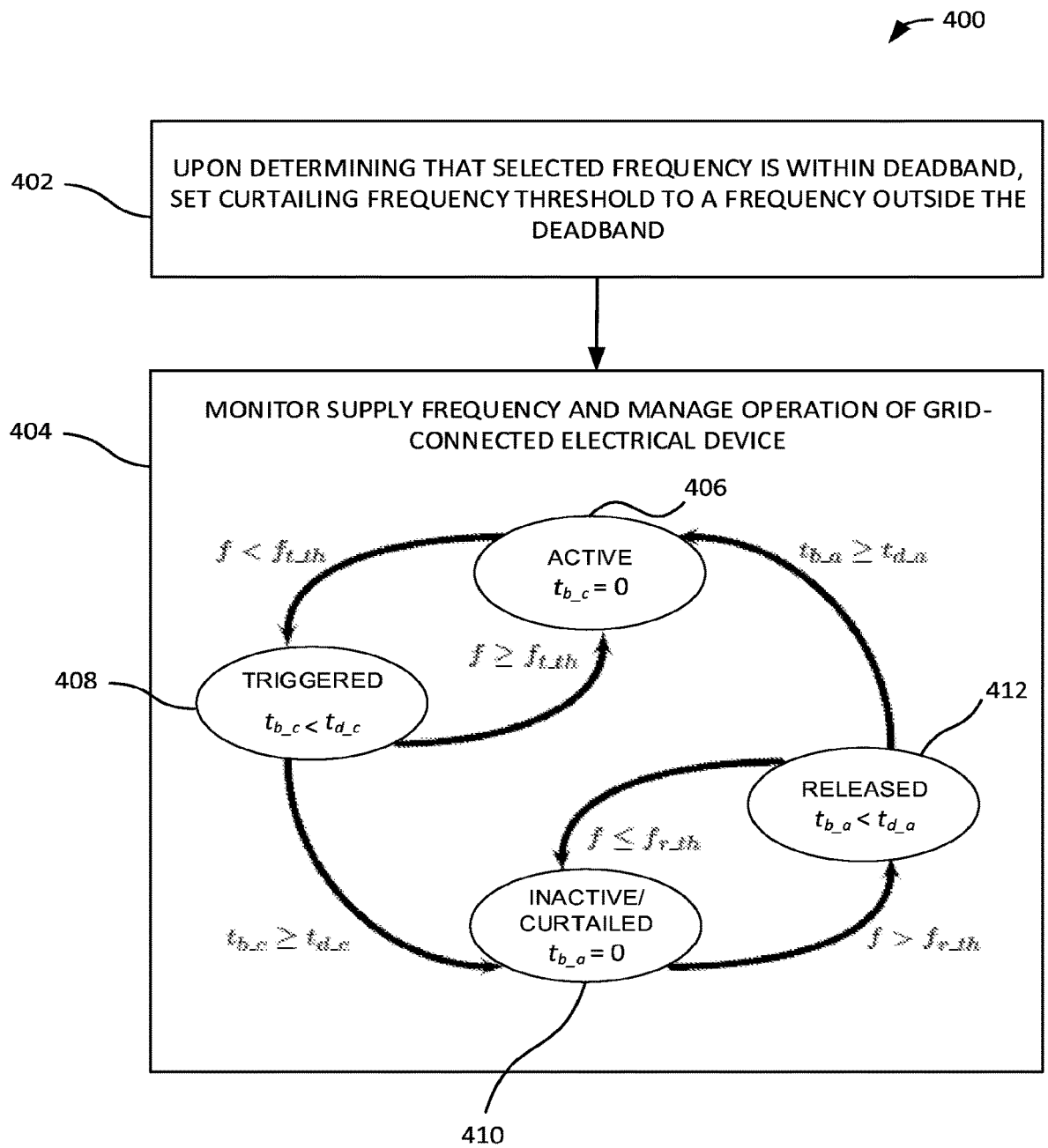
FIG. 4 is a flow chart illustrating an example method of managing a grid-connected electrical device using a selected curtailing frequency threshold.

FIG. 4 shows an example operational flow 400 for a controller implemented in an under-frequency example. In process block 402, upon determining that a frequency selected for use as a curtailing frequency threshold is within the deadband (e.g., as in process block 108 of FIG. 1), the curtailing frequency threshold is set to a frequency outside the deadband (e.g., a first available frequency). In process block 404, grid frequency is monitored and operation of a grid-connected electrical device is managed. In some examples, individual controllers have four different operating modes including active 406, triggered 408, curtailed 410, and released 412. In the active operating mode 406, the individual controller evolves based on its internal dynamics, turning ON or OFF according to its predefined control logic. Once the controller detects that the grid frequency falls below a predetermined curtailing frequency threshold $f_{t\_th}$, the controller changes its operating mode from active 406 to triggered 408. The controller remains in this mode as long as the grid frequency does not return above $f_{t\_th}$. A time $t_{b\_a}$ is the time the device has been in the released mode, and a time $t_{b\_c}$ is the time the device has been in the triggered mode.

If the under-frequency event persists longer than the response time $t_{d\_c}$ (curtailment time delay) of the controller, the device shuts down and switches from triggered 408 to curtailed 410. The time period of $t_{d\_c}$ is defined by the response time of a low-pass digital filter in charge of smoothing the frequency measurements in order to avoid reactions to unrealistic data and noise. Once the grid frequency rises above a predetermined restoring frequency threshold $f_{r\_th}$, where $f_{r\_th} > f_{t\_th}$, the controller switches from curtailed 410 to released 412 and remains in this mode provided the grid frequency stays above $f_{r\_th}$. If it has been released for a period of time longer than $t_{d\_a}$, the controller switches from released 412 to active 406, and follows its nominal internal dynamics. The activation time delay $t_{d\_a}$ is designed in order to minimize or reduce the rebound effect when all the controllers would turn on at the same time.

Figure 5:
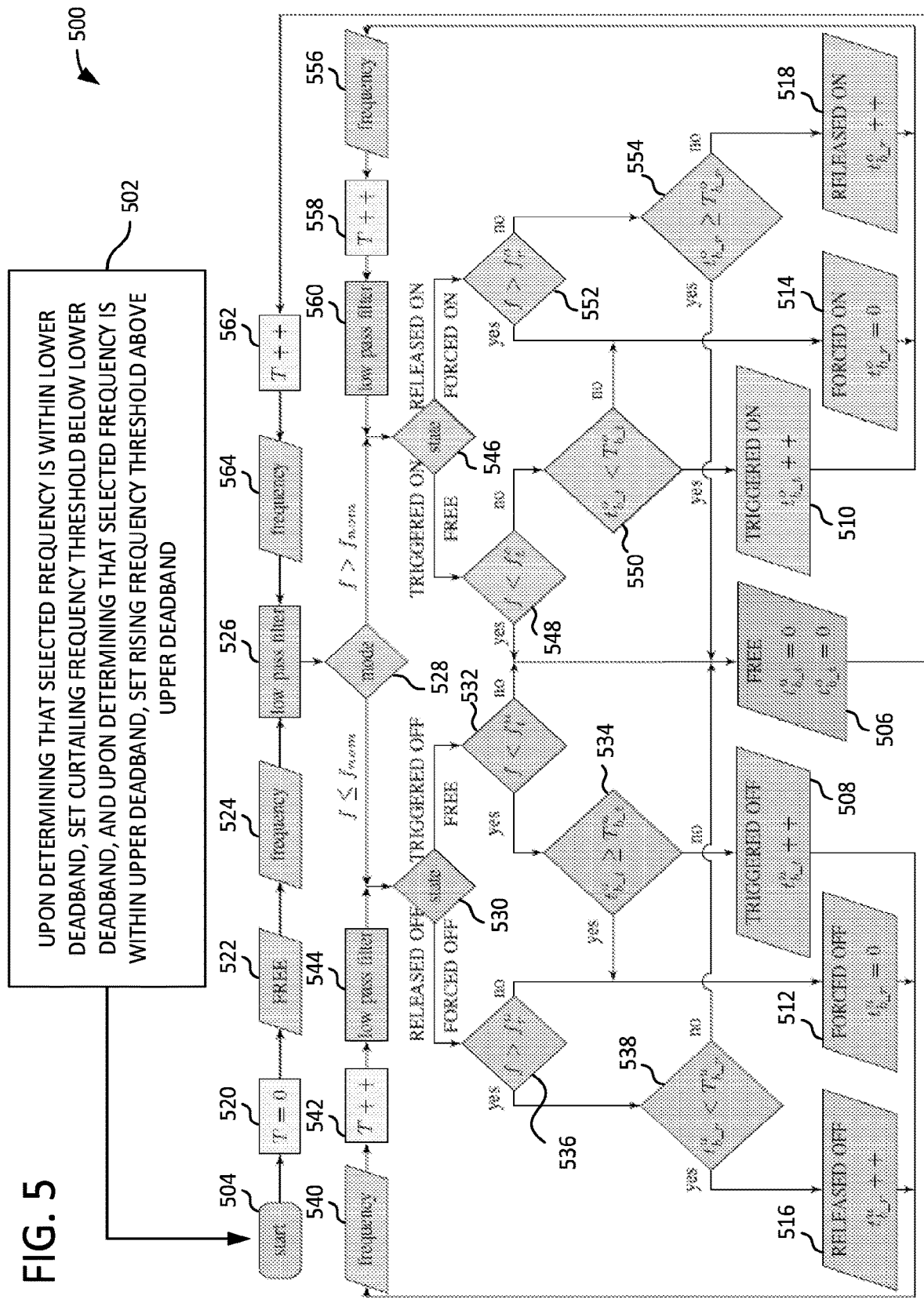
FIG. 5 is a flow chart illustrating an example method of managing a grid-connected electrical device using a selected curtailing frequency threshold and a selected rising frequency threshold.

FIG. 5 includes flow chart 500 that illustrates an example operation of a controller capable of providing primary frequency response for both over- and under-frequency events. In process block 502, if a selected frequency is within a lower deadband (curtailing deadband), then the curtailing frequency threshold is set below the lower deadband, and if a selected frequency is within an upper deadband (rising deadband), then the rising frequency threshold is set above the upper deadband. Frequency monitoring begins in process block 504.

Functionally, each individual controller has two different operating modes—under-frequency (f≤60 Hz) and over-frequency (f>60 Hz) modes (where 60 Hz is the nominal (target) frequency $f_{nom}$). In the under-frequency mode, the controller reacts to the under-frequency events. In the over-frequency mode, it reacts to the over-frequency events. In some examples, at any given time instant, the controller can only be operated in one mode, which is determined and changed according to the local frequency measurement. Furthermore, two operating modes can be further divided into seven different states including free 506, triggered off 508, triggered on 510, forced off 512, forced on 514, released off 516, and released on 518. In the state of free 506, the controller evolves based on their internal dynamics, turning ON or OFF according to their predefined internal control.

In process block 520, time is set to zero, and in process block 522, the initial state of the controller is set to free 506. The grid frequency is measured in process block 524 and provided to a low-pass filter in process block 526, and if the result indicates a frequency deviation, an operating mode (over- or under-frequency) is determined in process block 528. If the measured frequency is less than a target frequency, then a current state is set through process block 530 by way of process blocks 532, 534, 536, and/or 538. In process block 532, if the grid frequency falls below a predetermined curtailing frequency threshold $f_t^u$, the controller changes its operating state from free 506 to triggered off 508. If, in process block 534, the time of the frequency event $t_{b\_t}^u$ persists longer than the response time $T_{b\_t}^u$, the controller shuts down the device and switches it from triggered off 508 to forced off 512. The time period of $T_{b\_t}^u$ is defined by a low-pass filter (e.g., a digital low-pass filter, applied in process blocks 526, 544, and/or 560) in charge of smoothing the frequency measurements to avoid reactions to unrealistic data and noise.

Once the grid frequency rises above a predetermined restoring frequency threshold $f_r^u$ in process block 536, where $f_r^u > f_t^u$, the controller switches from forced off 512 to released off 516. The controller remains in this state, given that the frequency stays above $f_r^u$. If the controller has been in the state of released off 516 for a longer time $t_{b\_r}^u$ than the release time delay $T_{b\_r}^u$ as determined in process block 538, the controller switches its state back to free 506 and follows its nominal internal dynamics. The release time delay $T_{b\_r}^u$ is designed for the purpose of preventing the rebound effect that occurs when all the controllers try to return to their normal operations at the same time. Frequency is determined in process block 540, time is incremented in process block 542, and a low-pass filter is applied in process block

544 to prepare the most recent frequency measurement obtained in process block 540 for another iteration through process blocks 530-538.

If the measured frequency is greater than a target frequency (over-frequency event), then a current state is set through process block 546 by way of process blocks 548, 550, 552, and/or 554. In process block 548, if the grid frequency rises above a predetermined rising frequency threshold $f_t^o$, the controller changes its operating state from free 506 to triggered on 510. If, in process block 550, the time of the frequency event $t_{b\_t}^o$ persists longer than the response time $T_{b\_t}^o$, the controller turns on the device and switches it from triggered on 510 to forced on 514. The time period of $T_{b\_t}^o$ is defined by a low-pass filter in charge of smoothing the frequency measurements to avoid reactions to unrealistic data and noise.

Once the grid frequency rises above a predetermined restoring frequency threshold $f_r^o$ in process block 552, where $f_r^o < f_t^o$, the controller switches from forced on 514 to released on 518. The controller remains in this state, given that the frequency stays below $f_r^o$. If the controller has been in the state of released on 518 for a longer time $t_{b\_r}^o$ than the release time delay $T_{b\_r}^o$ as determined in process block 554, the controller switches its state back to free 506 and follows its nominal internal dynamics. The release time delay $T_{b\_r}^o$ is designed for the purpose of preventing the rebound effect that occurs when all the controllers try to return to their normal operations at the same time. Frequency is determined in process block 556, time is incremented in process block 558, and a low-pass filter is applied in process block 560 to prepare the most recent frequency measurement obtained in process block 556 for another iteration through process blocks 548-554. In some examples, the low-pass filter applied in process blocks 526, 544 and 560 are the same filter. From free state 506, time is incremented in process block 562, frequency is measured in process block 564, a low-pass filter is applied in process block 526, and a decision is again made in process block 528 as to whether to enter an under- or over-frequency mode.

Two under-frequency examples follow (similar examples can be constructed for the case of over-frequency events). A controller starts out in the state of free when the frequency starts to dip. When the frequency drops below the curtailing frequency threshold $f_t^u$, the controller changes its state to triggered off. Then, the frequency is restored above the restoring frequency threshold $f_r^u$ within the response time $T_{b\_t}^u$, so the controller changes its state back to free resuming the normal operation.

In a second example, the controller also starts in the state of free. When the frequency drops below the frequency threshold $f_t^u$, the controller changes its state to triggered off. In this case, the frequency is not restored above the frequency threshold $f_r^u$ within the response time $T_{b\_t}^u$, so the controller changes its state to forced off. The controller stays in the state of forced off until the frequency is restored above the frequency threshold $f_r^u$, and then changes its state to released off. However, the frequency does not stay above $f_r^u$ for enough time, so the controller changes its state back to forced off. After some time, the frequency returns above $f_r^u$ again and the controller changes its state to released off. Finally, the frequency stays above the $f_r^u$ for a longer time than the release time $T_{b\_r}^u$, so the controller changes its state to free resuming the normal operation.

Figure 6:
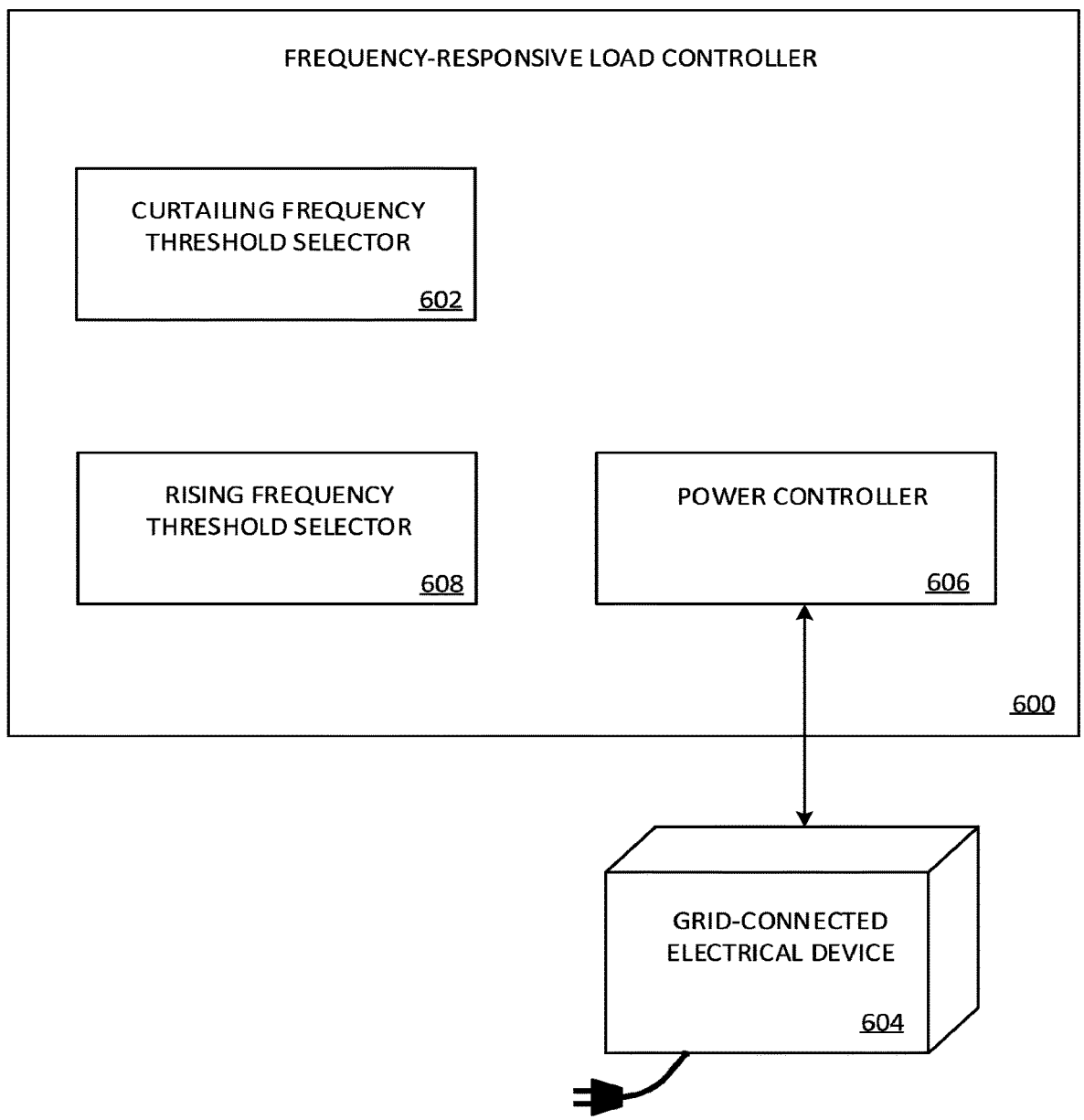
FIG. 6 is a block diagram of an example frequency-responsive load controller.

FIG. 6 illustrates a frequency-responsive load controller 600. Controller 600 includes a curtailing frequency threshold selector 602 implemented by computing hardware. The computing hardware can include a programmable logic device such as a field programmable gate array (FPGA), an application-specific integrated circuit (ASIC), and/or one or more processors and memory. Curtailing frequency threshold selector 602 is configured or programmed to select a frequency from a frequency range for use as a curtailing frequency threshold. The frequency range can be stored in the computing hardware (e.g., stored in memory). The curtailing frequency threshold is a grid frequency at or below which a grid-connected electrical device 604 associated with frequency-responsive load controller 600 is turned off.

Curtailing frequency threshold selector 602 is further configured or programmed to, upon determining that the frequency selected for use as the curtailing frequency threshold is within an under-frequency deadband of the frequency range, set the curtailing frequency threshold to a frequency lower than the under-frequency deadband but within the frequency range. The under-frequency deadband (also referred to as the lower deadband or curtailing deadband) is a frequency range over which the grid-connected electrical device is not turned off (and remains on if already on) by the frequency-responsive load controller. Curtailing frequency threshold selector 602 can be configured or programmed to perform any of the frequency threshold selection approaches described herein, including those discussed with respect to FIGS. 1-5.

Frequency-responsive load controller 600 also includes a power controller 606 implemented by the computing hardware. Power controller 606 is configured or programmed to monitor the grid frequency at grid-connected electrical device 604, and, upon determining that the grid frequency meets or falls below the curtailing frequency threshold, initiate a powering off of grid-connected electrical device 604. Power controller 606 can include a voltmeter, ammeter, or other measurement device. Power controller 606 can interface directly with a power supply circuit (e.g., a switch) of grid-connected electrical device 604 or can transmit a power control signal to a different circuit or component of grid-connected electrical device 604.

In some examples, the frequency lower than the under-frequency deadband but within the frequency range that is set as the curtailing frequency threshold is a first available frequency lower than the under-frequency deadband. In other examples, a second, third, or other available frequency lower than the under-frequency deadband is used. In still other examples, the frequency set as the curtailing frequency threshold is selected from a narrow frequency band lower than the deadband (e.g., less than half of the range from the end of the under-frequency deadband to the end of the frequency range).

Controller 600 can also comprise a rising frequency threshold selector 608 implemented by the computing hardware. Rising frequency threshold selector 608 is configured or programmed to select a second frequency from a second frequency range for use as a rising frequency threshold. The rising frequency threshold is a grid frequency at or above which grid-connected electrical device 604 is turned on. Rising frequency threshold selector 608 is further configured or programmed to, upon determining that the second frequency is within an over-frequency deadband of the second frequency range, set the rising frequency threshold to a frequency higher than the over-frequency deadband but within the second frequency range. The over-frequency deadband (also referred to as the upper deadband or rising deadband) is a frequency range over which grid-connected electrical device 604 is not turned on by frequency-responsive load controller 600. In examples in which rising frequency threshold selector 608 is present, power controller 606 is further configured or programmed to, upon determining that the grid frequency meets or rises above the rising frequency threshold, initiate a powering on of grid-connected electrical device 604.

In some examples, the frequency higher than the over-frequency deadband but within the frequency range that is set as the rising frequency threshold is a first available frequency higher than the over-frequency deadband. In other examples, the frequency set as the rising frequency threshold is selected from a narrow frequency band higher than the deadband (e.g., less than half of the range from the end of the over-frequency deadband to the end of the frequency range). Frequency-responsive load controller 600 can include curtailing frequency threshold selector 602 and not rising frequency threshold selector 608, rising frequency threshold selector 608 and not curtailing frequency threshold selector 602, or both curtailing frequency threshold selector 602 and rising frequency threshold selector 608.

Example Hardware Configurations

In an example computing hardware configuration of an under-frequency frequency-responsive load controller, a 5-cm×7.5-cm (2-in.×3-in.) digital electronic controller board is used. The digital intelligence is based on an Altera FPGA. Inputs to the controller board include 5 V DC, which is used to power the board, and a 24 V AC voltage-sensing input from a voltage transformer that is used to sense grid frequency of a grid-connected electrical device's 120 or 240 V AC electric service. The AC signal is conditioned by a series of comparators that convert the AC sinusoid into a square-wave signal having fast rise and fall times. The period of the resulting 60 Hz square wave is measured using the pulse count from a 7.2 MHz crystal oscillator reference. Outputs of the controller board consist of several digital outputs, the characteristics and meanings of which can be assigned by firmware. In this example, only the "relay control" signal is passed along to the controlled electrical device. This signal is pulled to its low logic state while a curtailment response was being requested from the controlled electrical device. Remaining output pins are assigned to facilitate testing and troubleshooting, but these additional signals are not used for device control in this example.

In this example, the output of the controller is a binary signal. Grid-connected electrical device load current does not flow through any part of the controller board. In examples in which the electrical device is an electric water heater, the binary output signals can be used to control relay switches in the control modules for water-heater loads. In examples in which the electrical device is a clothes dryer, optically isolated versions of the controllers' output signals can be sent to the dryer's communication processors, where they can be translated into the dryer's proprietary serial protocol and sent to and understood by the dryer's microcontrollers.

Figure 7:
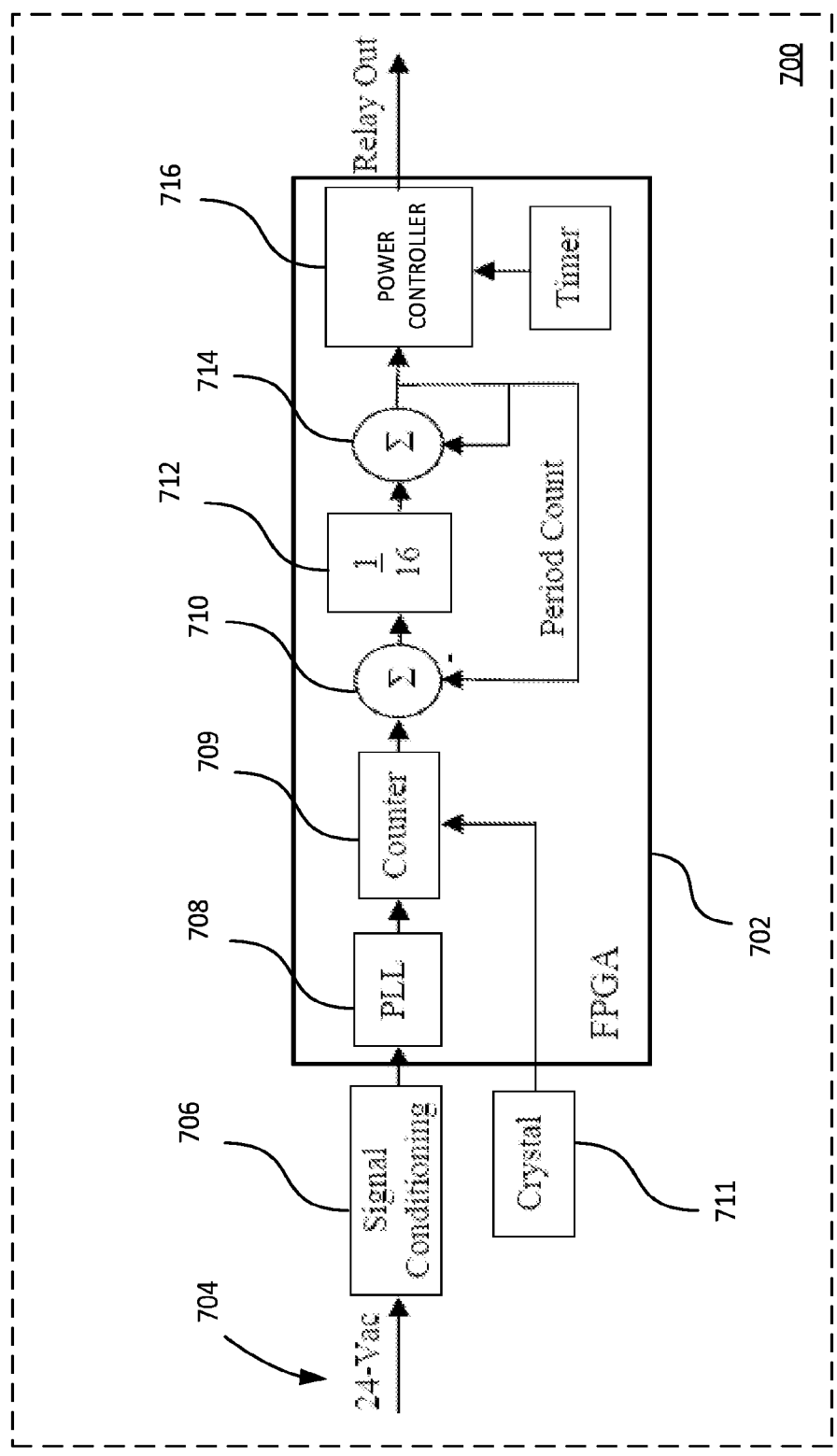
FIG. 7 is a block diagram of an example frequency-responsive load controller implemented using a field programmable gate array (FPGA).

Portions of an example controller 700 are illustrated in FIG. 7. FPGA 702 can be or can be similar to an Altera EPM7128BTC100-10 FPGA. This FPGA embodiment is by way of example only, as other circuits or processing devices can be used, such as application specific integrated circuits (ASICs) or microprocessors executing suitable instructions for performing the disclosed functions. In the example of FIG. 7, a hardware gate design approach is used to achieve an efficient implementation using the limited number of macrocells of FPGA 702. In some examples, controller 700 determines frequency by measuring the period of an input signal 704. Input signal 704 is stepped-down to 24 V AC from an, e.g., 120 or 240 V, AC voltage. The period of the signal is the reciprocal of the signal's frequency. A signal conditioning stage 706 can include, for example, a series of comparators. The conditioned 60 or 50 Hz square wave from the power grid is an input to a phase locked loop (PLL) 708 that is implemented using FPGA 702. PLL 708 removes jitter from the period measurement and prevents logic confusions that can occur when multiple zero crossings occur in noisy device electrical environments. The period of the output of PLL 708 is measured at counter 709 using a pulse count from an (e.g., 7.2 MHz) crystal oscillator 711 reference.

A difference is taken in summation stage 710 between the period measured using PLL 708 and counter 709 and the present reported period of controller 700 (the negative of the period count is summed with the measured period, resulting in a difference). This difference is an error signal. The error signal is then divided by an integer in stage 712 to create a low-pass filtered tracking of the actual frequency. In some examples, the divisor 16 is used, but any other divisor can be used and is within the scope of the disclosed technology. This divisor removes the responses to high-frequency noise, but it also slows the response to legitimate changes, as is typical for low-pass filtering. The result of this division (an attenuated error signal) in stage 712 is then added to the reported period in summation stage 714. The reported period is then digitally compared against thresholds by power controller 716, which can be similar to power controller 608 of FIG. 6, to determine the state of an output-control signal. FPGA 702 is also used to implement at least one of a curtailing threshold frequency selector (not shown) or rising threshold frequency selector (not shown) that can be similar to the corresponding components in FIG. 6.

Frequency Range Determination Examples and Examples of Supervised Arrangements

The frequency threshold selection technologies described herein can also be used in a hierarchical decentralized control strategy for engaging the end-use loads to provide primary frequency response. In some examples, two decision-making layers including supervisory and device layers, are used. Additional decision-making layers can also be used. Frequency-responsive load controllers at the device layer can still be operated in an autonomous fashion to provide a quick response while a coordinator at the supervisory layer coordinates the autonomous responses to overcome the stability issue associated with high penetration of controllers. These approaches provide an aggregated response that is droop-like without over-responding to frequency deviations due to high controller penetration. Simulation results illustrate the effectiveness of such a hierarchical decentralized control strategy in providing primary frequency response using controllers associated with grid-connected electrical devices.

Figure 8:
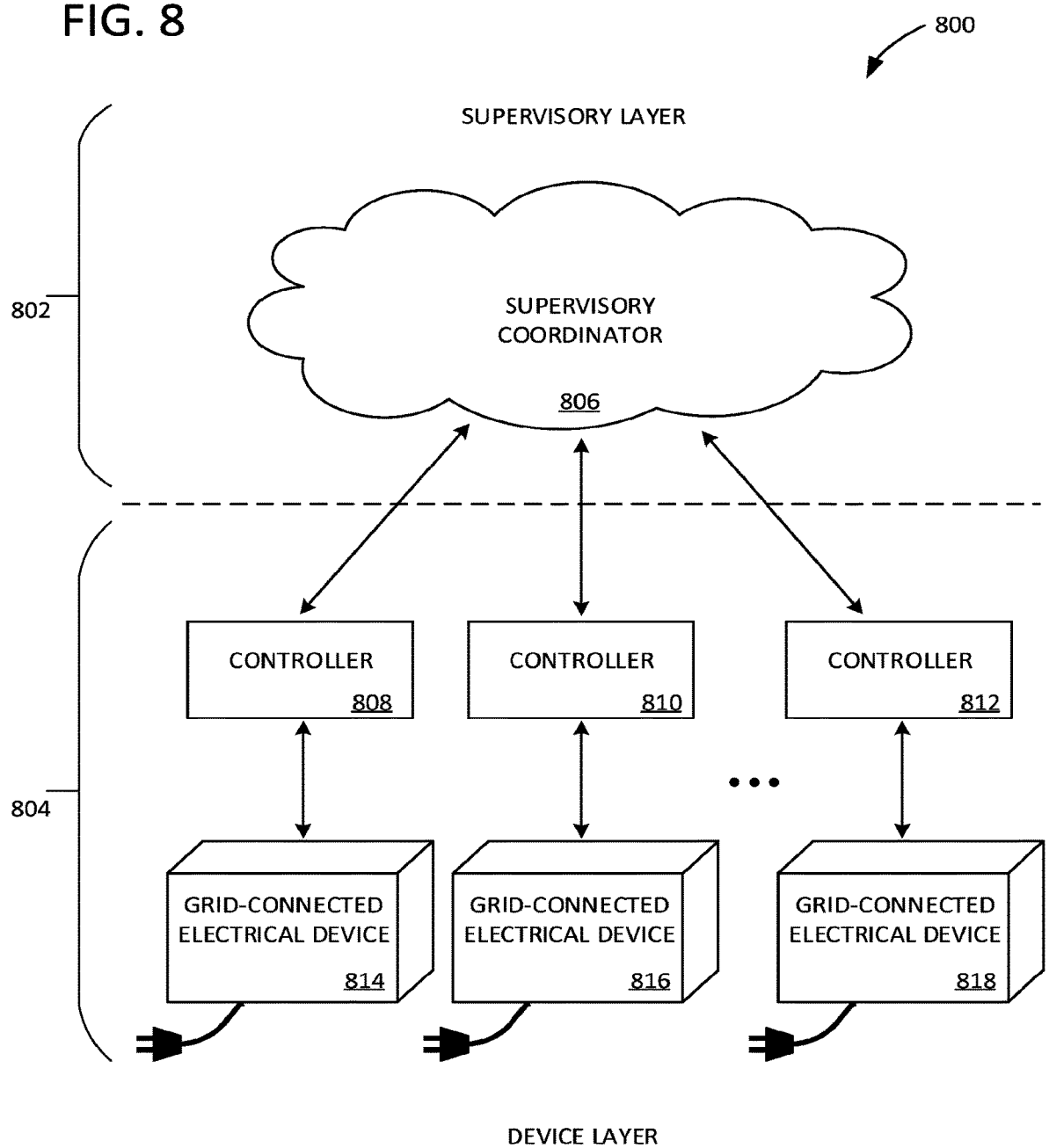
FIG. 8 is a block diagram of an example hierarchical power grid management system in which a supervisory controller communicates with individual frequency-responsive load controllers.

FIG. 8 illustrates a hierarchical decentralized arrangement 800 that includes two decision-making layers—a supervisory layer 802 and a device layer 804. In supervisory layer 802, a supervisory coordinator 806 is responsible for ensuring that an aggregated response from engaged controllers is droop-like during frequency events and preventing the aggregated response from being excessive under high penetration of controllers. Supervisory coordinator 806 can be, for example, implemented on one or more server computers in the cloud or on a particular computing device or devices accessible over a network such as the Internet. In some examples, additional intermediate decision-making layers are present.

Supervisory coordinator 806 communicates with controllers 808, 810, and 812. Controllers 808, 810, and 812 are associated with grid-connected electrical devices 814, 816, and 818, respectively. Communication between supervisory coordinator 806 and controllers 808, 810, and 812 can occur, for example, once every control period (e.g., once every 5, 10, 15, 30, or 60 min, etc.) and/or after a request has been sent by or received by supervisory coordinator 806 based on non-time-based criteria (e.g., total system load, total available generation, historical frequency deviation information, etc.). Communication can occur, for example, over the Internet or other computer network, over a cellular network, through power line communication (PLC), or through other approaches.

In examples in which periodic communication is used, the length of the control period can be selected based on the characteristics of controllers 808, 810, and 812 and/or based on historical frequency deviation information, characteristics of the grid, or other factors. Controllers 808, 810, and 812 submit power information, including power rating (in kW) and power mode (ON or OFF), to supervisory coordinator 806 at the beginning of each control period or upon request. After collecting the power information, supervisory coordinator 806 divides controllers 808, 810, and 812 (as well as other available controllers) into two groups. The ON group consists of those controllers that are currently ON and will provide under-frequency response. The OFF group consists of those controllers that are OFF and will provide over-frequency response. Supervisory coordinator 806 then calculates the total aggregated power of each group, Pmax and selects the desired droop value R for each group based on the corresponding magnitude of Pmax. This is illustrated in FIG. 9.

Figure 9:
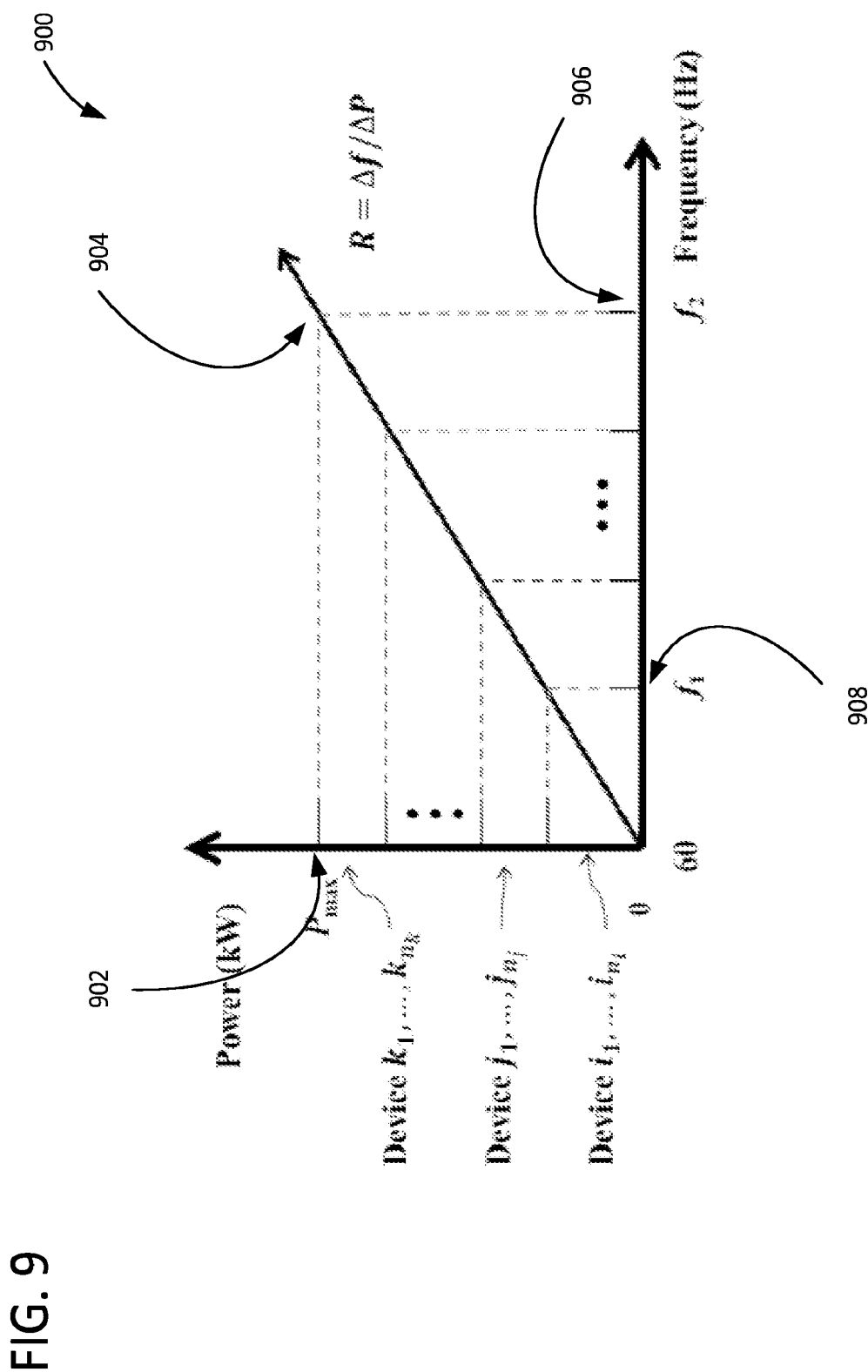
FIG. 9 is a block diagram of an example target power-frequency curve.

FIG. 9 shows a graph 900 of power vs. frequency. Desired droop R is calculated as the change in frequency divided by change in power. As an example, for an aggregated amount of power 902 (Pmax), a horizontal line is determined to a point 904 on the desired droop curve. A vertical line is then determined down to identify the corresponding boundary frequency 906 ($f_2$) that indicates the end of the frequency range available for use as frequency thresholds. A deadband bound frequency 908 ($f_1$) is also shown. In some examples, deadband bound frequency 908 is a fixed value, and in other examples, deadband bound frequency 908 is adjusted periodically (and in some examples every control period) based on historical frequency events, grid performance, or other factors. For different values of Pmax, the desired droop curve can similarly be used to identify a boundary frequency.

Returning now to FIG. 8, supervisory coordinator 806 communicates information to individual controllers 808, 810, and 812 based on the aggregated power information. In some examples, supervisory coordinator 806 determines the frequency range(s) from which frequency thresholds can be selected and communicates the range(s) to controllers 808, 810, and 812. Controllers 808, 810, and 812 then select frequency thresholds from the ranges and monitor the grid locally. The boundary frequency (e.g., $f_2$ from FIG. 9) can be communicated, and in some examples, the deadband bound frequency is also communicated. In a periodic update example, supervisory coordinator 806 receives current power information, determines new frequency ranges (e.g., as illustrated in FIG. 9), and communicates the new ranges back to controllers 808, 810, and 812. Controllers 808, 810, and 812 continue to operate autonomously, but each control period the controllers receive an updated frequency range and select a new frequency threshold from the updated range.

In other examples, supervisory coordinator 806 both determines the frequency range(s) and (e.g., randomly) selects frequency thresholds from the range(s) and communicates the selected thresholds to individual controllers. Supervisory coordinator 806 can account for the power of the loads associated with the controllers. For example, frequency thresholds can be assigned to particular controllers based on the associated power of the load to help maintain a linear response.

In decentralized hierarchical arrangement 800, by determining $f_2$ indirectly through the selection of R (e.g., as shown in FIG. 9), the maximum frequency deviation responded to becomes dependent on the penetration level of controllers, which effectively overcomes the issue of excessive response under high controller penetration. In some examples, multiple supervisory coordinators are used, each coordinator supervising a feeder, substation, or other grid unit. In other examples, a single supervisory coordinator is used for the entire grid.

Decentralized hierarchical arrangements were tested using the IEEE 16-machine 68-bus test system. The system parameters were taken from the data files that come with the Power System Toolbox (PST) distribution. The total load in the system was 18,333.90 MW with 5,039.00 MW in area 4 and 7,800.95 MW in area 5. The controllers are selected to be electric water heaters, which are evenly distributed among area 4 and 5. The response time delay $T_{b_t}^u$ and $T_{b_t}^o$ were selected to be 0.4 seconds, while the release time delay $T_{b_r}^u$ and $T_{b_r}^o$ were randomly chosen between two and three minutes.

Two example scenarios were investigated. In the first scenario, load bus 7 was tripped to create an over-frequency event. Two different penetration levels of controllers (400 MW and 2700 MW) were simulated. A plot of rotor speed responses indicates that the decentralized control strategy (without a supervisory coordinator) greatly improves the primary frequency response when the penetration level of controllers is low. However, as the penetration level increases, excessive response from controllers negatively impacts the system response when the penetration level is high. By taking a hierarchical decentralized control approach to controllers under high penetration, the excessive response was effectively avoided through the coordination of the supervisory coordinator.

In the second scenario, generator G1 was tripped to create an under-frequency event and repeat the same simulation scenarios as the first scenario. Simulation results indicate a similar advantage (as in the first scenario) of hierarchical decentralized control over a decentralized control strategy without supervision.

Figure 10:
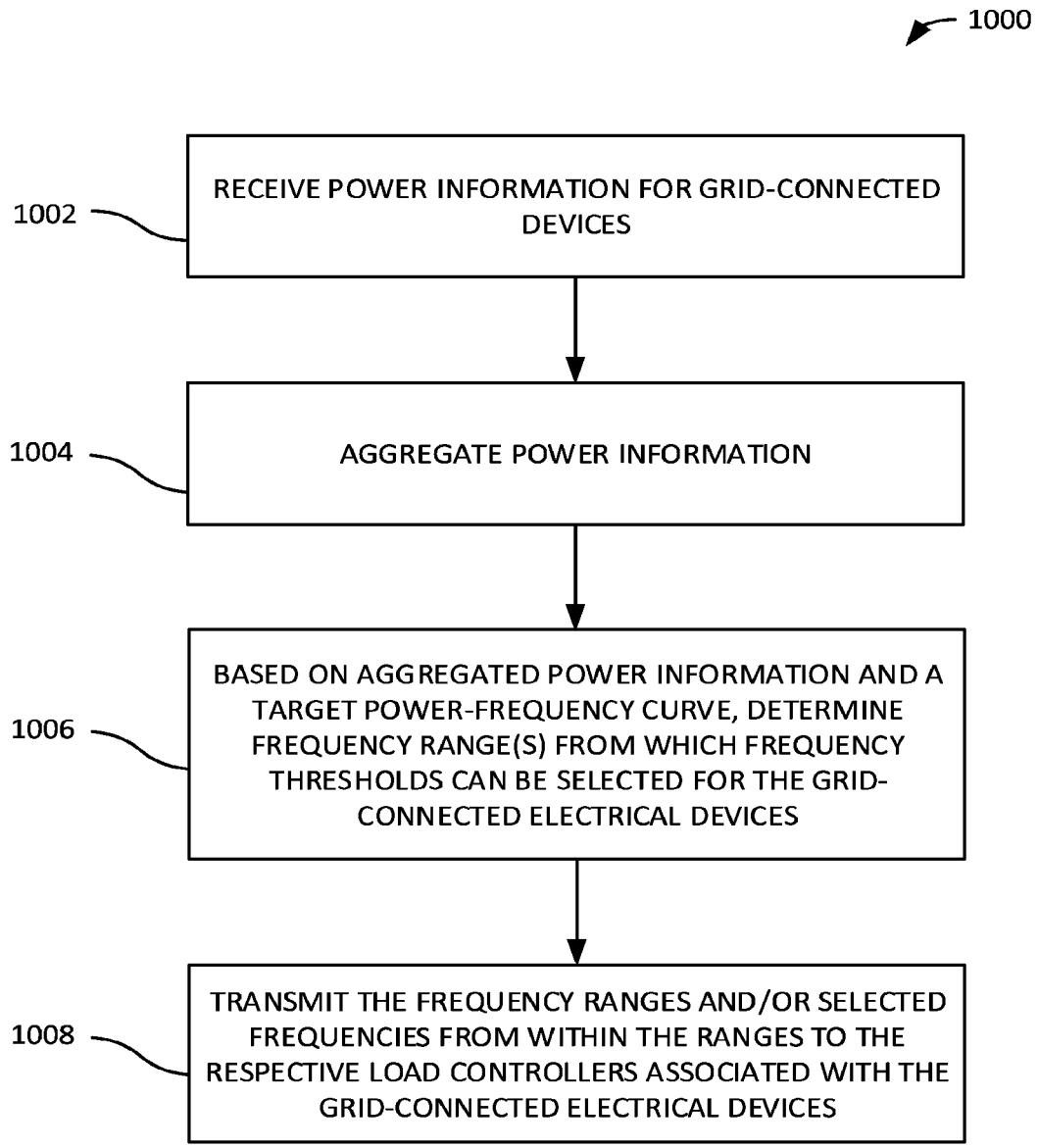
FIG. 10 is a diagram illustrating an example method of managing frequency response in an electrical power distribution system using grid-connected electrical devices.

FIG. 10 illustrates an example method 1000 of managing frequency response in an electrical power distribution system. Method 1000 can be performed, for example, by a supervisory coordinator such as supervisory coordinator 806 of FIG. 8. In process block 1002, power information is received for a plurality of grid-connected electrical devices. The power information can include a power load rating (e.g., in kWh) and can also include an on-or-off status. Power information can be reported by individual controllers in response to a request from a supervisory coordinator or reporting can be initiated by the individual controllers (e.g., periodically). The received power information is aggregated in process block 1004.

Based on the aggregated power information and a target power-frequency curve, one or more frequency ranges from which frequency thresholds can be selected for the respective grid-connected electrical devices are determined in process block 1006. For a respective grid-connected electrical device, the frequency threshold is a grid frequency at which the grid-connected electrical device is automatically turned off or turned on by an associated frequency-responsive load controller. The target power-frequency curve can be a desired droop or droop-like response as illustrated in FIG. 9. In some examples, process block 1006 further comprises determining an under-frequency range from which curtailing frequency thresholds can be selected and determining an over-frequency range from which rising frequency thresholds can be selected.

In process block 1008, at least one of (i) the one or more frequency ranges or (ii) one or more selected frequencies within the one or more frequency ranges are transmitted to the respective frequency-responsive load controllers associated with the respective grid-connected electrical devices. In some examples, the receiving, aggregating, and transmitting are performed periodically (e.g., every 5, 10, 15, 30, or 60 min, etc.). The frequency ranges or selected frequencies transmitted in process block 1008 can be transmitted over a computer network, such as the Internet, over a cellular network, using PLC, or through other approaches from a supervisory coordinator to the individual frequency-responsive load controllers associated with the grid-connected electrical devices.

In some examples in which multiple supervisory coordinators are used, after collecting power ratings of controllers at the beginning of each control period, supervisors located at different feeders can use information discovery approaches to determine the total power of online controllers in the system. For example, the supervisors can run consensus algorithms by exchanging the current power of online controllers under their supervision with neighboring supervisors. Once the total power of online controllers is known, each supervisor can determine a new range accordingly and then broadcast the range to the supervised controllers, which can randomly pick a frequency threshold from the new range.

Additional Examples

Various market mechanisms can be used to further penetration of frequency-responsive load controllers into the grid. In such examples, a supervisory coordinator can collect additional information from the controllers, including device states other than on/off and/or a "willingness" or priority factor. The willingness factor can be based on an expressed user preference (i.e., an amount or relative amount of device management the user is willing to tolerate) or it can be based on device states. For example, if a water heater is nearly finished returning to a set temperature, which indicates that a person using the water heater may not be inconvenienced much by the water heater being turned off to manage grid frequency, a higher willingness factor can be sent to the supervisory coordinator. Conversely, if a water heater has just started bringing the temperature of the water up from a low value toward a target, a lower willingness factor can be sent. Controllers with a high willingness factor can be used before other controllers to manage frequency response. The willingness factor can be, for example, a number between 1 and 10, 1 and 100, 0 and 1, a letter between a and z, etc.

Rewards can be provided to users based on the willingness factor. In examples in which the willingness factor is based on a device state, a lower reward can be provided to a user with a high device-based willingess factor. Continuing the water heater example, if the water heater were about to shut off anyway, allowing the controller to shut the device off is not highly rewarded, whereas if the water heater were just beginning to heat, shutting off the water heater may be a large inconvenience to a user, and allowing the controller to shut the device off is rewarded. The willingness factor reflects these device states and is used to adjust how much reward a user receives. As another example, if a user specifies a high willingness to have the controller shut off the user's device regardless of state, then the user's device can be shut off before others, and if the current device state is one that would not normally be rewarded highly, the user can still receive a larger reward for effectively volunteering via the user's expressed preference. Rewards can be, for example, usage or bill credits or lower kWh rates.

The described market mechanisms can be implemented as a central clearing mechanism using two independent double-auction markets of, for example, five or ten minutes (ON-to-OFF and OFF-to-ON).

Example Computing Environments

Figure 11:
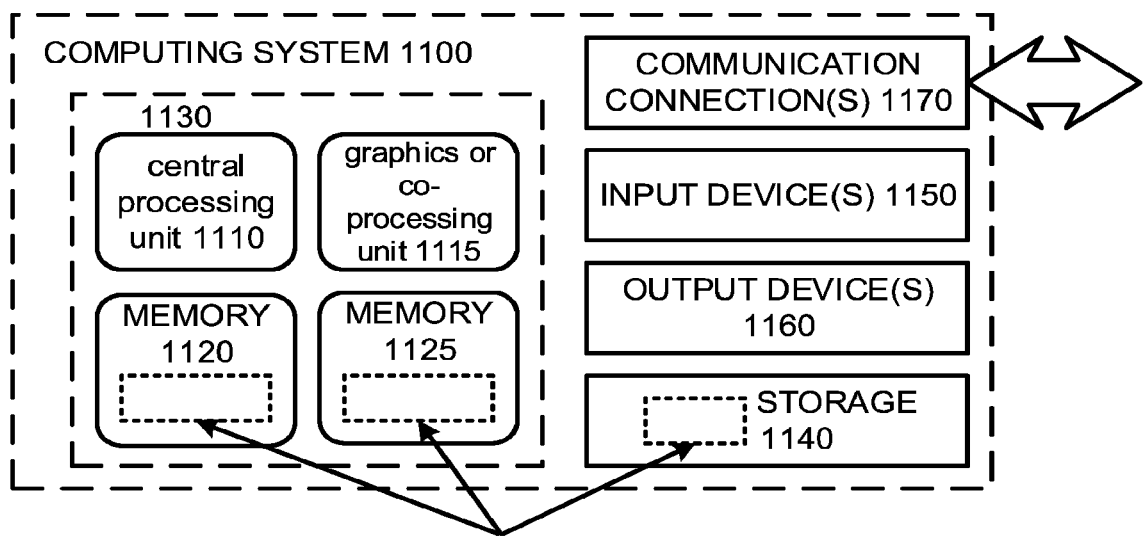
FIG. 11 is an example computing environment that can be used in conjunction with the technologies described herein.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, such as curtailing frequency threshold selector 602 and rising frequency threshold selector 608 of FIG. 6, in the form of computer-executable instructions suitable for execution by processing units 1110 and/or 1115. A programmable logic device (PLD), such as an FPGA, can execute programmable-logic-device-executable instructions. An example of programmable-logic-device-executable instructions is the configuration bits for programming the PLD (such as a ".bit" file for a Xilinx® FPGA).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method of managing frequency response using a grid-connected electrical device, the method comprising:
   determining a frequency range extending from a target grid frequency to an end frequency;
   identifying a first portion of the frequency range as a deadband, the first portion extending from the target grid frequency to a deadband bound frequency;
   identifying a second portion of the frequency range extending from the deadband bound frequency to the end frequency;
   selecting a frequency, from the frequency range, for use as a frequency threshold, wherein the frequency threshold is a grid frequency at which the grid-connected electrical device is automatically turned off or turned on by an associated frequency-responsive load controller, wherein the grid-connected electrical device is not automatically turned off or turned on when the frequency threshold is within the deadband;
   upon determining that the frequency selected for use as the frequency threshold is within the deadband, setting the frequency threshold to a new frequency within the second portion of the frequency range that is farther away from the target grid frequency than the selected frequency and outside of the deadband; and
   establishing the new frequency as the frequency threshold at which the associated frequency-responsive load controller automatically turns the grid-connected electrical device on or off.

2. The method of claim 1, further comprising upon determining that the grid frequency meets the frequency threshold, turning off or turning on the grid-connected electrical device.

3. The method of claim 1, wherein the deadband bound frequency is lower than the target grid frequency, wherein the end frequency is lower than both the deadband bound frequency and the target grid frequency, wherein the frequency threshold is a curtailing frequency threshold, and wherein the curtailing frequency threshold is the grid frequency at which the grid-connected electrical device is turned off by the associated frequency-responsive load controller.

4. The method of claim 1, wherein the deadband bound frequency is higher than the target grid frequency, wherein the end frequency is higher than both the deadband bound frequency and the target grid frequency, wherein the frequency threshold is a rising frequency threshold, and wherein the rising frequency threshold is the grid frequency at which the grid-connected electrical device is turned on by the associated frequency-responsive load controller.

5. The method of claim 1, wherein selecting the frequency comprises using a probabilistic approach to select the frequency from a group of available frequencies in the frequency range.

6. The method of claim 5, wherein the probabilistic approach is random selection.

7. The method of claim 1, wherein the new frequency is set is a closest available frequency to the deadband bound frequency.

8. The method of claim 1, wherein the second portion of the frequency range comprises a third portion extending from the deadband bound to less than halfway from the deadband bound to the end bound, and wherein the new frequency is set is within the third portion.

9. The method of claim 8, wherein the new frequency to which the frequency threshold is set, which is within both the second and third portion, is randomly selected from a group of available frequencies within the third portion.

10. The method of claim 1, wherein determining the frequency range, identifying the first portion of the frequency range, identifying the second portion of the frequency range, selecting the frequency, setting the frequency threshold, and establishing the new frequency, are performed by the associated frequency-responsive load controller.

11. The method of claim 1, wherein the frequency range is determined by receiving instructions from a supervisory coordinator configured to establish the frequency range based on aggregated characteristics of a plurality of grid-connected electrical devices being managed by corresponding frequency-responsive load controllers.

12. The method of claim 1, wherein determining the frequency range, identifying the first portion of the frequency range, identifying the second portion of the frequency range, selecting the frequency, and setting the frequency threshold are performed by a supervisory coordinator managing a plurality of grid-connected electrical devices via respective associated frequency-responsive load controllers.

13. A frequency-responsive load controller comprising:
   a curtailing frequency threshold selector implemented by computing hardware, the curtailing frequency threshold selector configured or programmed to:
      select a frequency from a frequency range for use as a curtailing frequency threshold, wherein the curtailing frequency threshold is a grid frequency at or below which a grid-connected electrical device associated with the frequency-responsive load controller is turned off; and
      upon determining that the frequency selected for use as the curtailing frequency threshold is within an under-frequency deadband of the frequency range, set the curtailing frequency threshold to a frequency lower than the under-frequency deadband but within the frequency range, wherein the under-frequency deadband is a frequency range over which the grid-connected electrical device is not turned off by the frequency-responsive load controller; and
   a power controller implemented by the computing hardware, the power controller configured or programmed to:
      monitor the grid frequency at the grid-connected electrical device; and
      upon determining that the grid frequency meets or falls below the curtailing frequency threshold, initiate a powering off of the grid-connected electrical device.

14. The frequency-responsive load controller of claim 13, wherein the frequency lower than the under-frequency deadband but within the frequency range is a first available frequency lower than the under-frequency deadband.

15. The frequency-responsive load controller of claim 13, further comprising:
   a rising frequency threshold selector implemented by the computer hardware the rising frequency threshold selector configured or programmed to:
      select a second frequency from a second frequency range for use as a rising frequency threshold, wherein the rising frequency threshold is a grid frequency at or above which the grid-connected electrical device is turned on; and
      upon determining that the second frequency is within an over-frequency deadband of the second frequency range, set the rising frequency threshold to a frequency higher than the over-frequency deadband but within the second frequency range, wherein the over-frequency deadband is a frequency range over which the grid-connected electrical device is not turned on by the frequency-responsive load controller, and wherein the power control is further configured to, upon determining that the grid frequency meets or rises above the rising frequency threshold, initiate a powering on of the grid-connected electrical device.

16. The frequency-responsive load controller of claim 15, wherein the frequency higher than the over-frequency deadband but within the frequency range is a first available frequency higher than the over-frequency deadband.

17. One or more non-transitory computer-readable media storing computer-executable or programmable-logic-device-executable instructions for managing frequency response in an electrical power distribution system, the managing comprising:

receiving power information for a plurality of grid-connected electrical devices;

aggregating the received power information;

based on the aggregated power information and a target power-frequency curve, determining one or more frequency ranges from which frequency thresholds can be selected for the respective grid-connected electrical devices, wherein for a respective grid-connected electrical device, the frequency threshold is a grid frequency at which the grid-connected electrical device is automatically turned off or turned on by an associated frequency-responsive load controller;

selecting, for the respective grid-connected electrical devices, a frequency threshold;

upon determining that one or more of the frequency thresholds for the grid-connected electrical devices are within a deadband on either side of a target grid frequency in which grid-connected electrical devices are not automatically turned off or turned on by the associated frequency-responsive load controllers, probabilistically setting the one or more of the frequency thresholds to new frequency thresholds within a frequency range outside of the deadband;

transmitting the one or more frequency thresholds to the respective frequency-responsive load controllers, wherein the frequency-responsive load controllers establish the frequency thresholds as the frequencies at which the associated grid-connected electrical devices are automatically turned on or turned off.

18. The one or more non-transitory computer-readable media of claim 17, wherein the receiving, aggregating, and transmitting are performed periodically.

19. The one or more non-transitory computer-readable media of claim 17, wherein the power information comprises a power load rating and an on-or-off status.

20. The one or more non-transitory computer-readable media of claim 17, wherein determining the one or more frequency ranges comprises determining an under-frequency range from which curtailing frequency thresholds can be selected and determining an over-frequency range from which rising frequency thresholds can be selected.

* * * * *